(12) United States Patent
Tamaru

(10) Patent No.: US 9,001,155 B2
(45) Date of Patent: Apr. 7, 2015

(54) AUGMENTED REALITY PROVIDING APPARATUS

(71) Applicant: FUJIFILM Corporation, Tokyo (JP)

(72) Inventor: Masaya Tamaru, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 13/889,916

(22) Filed: May 8, 2013

(65) Prior Publication Data

US 2013/0241955 A1 Sep. 19, 2013

Related U.S. Application Data

(63) Continuation of application No. PCT/JP2011/070281, filed on Sep. 6, 2011.

(30) Foreign Application Priority Data

Nov. 9, 2010 (JP) ................................. 2010-251304

(51) Int. Cl.
| | |
|---|---|
| G09G 5/00 | (2006.01) |
| G02B 27/01 | (2006.01) |
| G02B 27/22 | (2006.01) |
| H04N 13/00 | (2006.01) |
| H04N 13/02 | (2006.01) |
| H04N 13/04 | (2006.01) |
| G06T 19/00 | (2011.01) |

(52) U.S. Cl.
CPC .............. *G02B 27/017* (2013.01); *G02B 27/01* (2013.01); *G02B 27/2228* (2013.01); *H04N 13/0018* (2013.01); *H04N 13/0033* (2013.01); *H04N 13/004* (2013.01); *H04N 13/0239* (2013.01); *H04N 13/044* (2013.01); *G06T 19/006* (2013.01); *G02B 2027/014* (2013.01); *G02B 2027/0187* (2013.01)

(58) Field of Classification Search
CPC .............................. G06T 19/006; G06F 3/011
See application file for complete search history.

(56) References Cited

U.S. PATENT DOCUMENTS

| | | | |
|---|---|---|---|
| 5,742,264 A | 4/1998 | Inagaki et al. | |
| 2006/0170652 A1 | 8/2006 | Bannai et al. | |

(Continued)

FOREIGN PATENT DOCUMENTS

| | | |
|---|---|---|
| CN | 1815409 A | 8/2006 |
| CN | 101067762 A | 11/2007 |

(Continued)

OTHER PUBLICATIONS

PCT/ISA/210—International Search Report mailed on Oct. 4, 2011, issued in PCT/JP2011/070281.

(Continued)

*Primary Examiner* — David H Chu
(74) *Attorney, Agent, or Firm* — Birch, Stewart, Kolasch & Birch, LLP

(57) ABSTRACT

Provided is an augmented reality providing apparatus capable of preventing an image sickness and reduction of a third party. When a position measurement reliability is less than a first threshold and a movement of HMD 100 is a second threshold or more, the HMD 100 does not output the same virtual combined images as that displayed on display units 3R, 3L, but outputs virtual combined image having been stored in an image storing unit 17 and displayed on the display units 3R, 3L previously to an external display device.

9 Claims, 18 Drawing Sheets

(56) References Cited

U.S. PATENT DOCUMENTS

2007/0258658 A1    11/2007    Kobayashi et al.
2008/0266386 A1    10/2008    Maeda

FOREIGN PATENT DOCUMENTS

| | | |
|---|---|---|
| CN | 101295206 A | 10/2008 |
| JP | 8-292394 A | 11/1996 |
| JP | 2006-276748 A | 10/2006 |
| JP | 2006-293605 A | 10/2006 |
| JP | 2007-299326 A | 11/2007 |
| JP | 2010-50645 A | 8/2008 |
| WO | WO 2008/096719 A | 8/2008 |

OTHER PUBLICATIONS

PCT/ISA/237—mailed on Oct. 4, 2011, issued in PCT/JP2011/070281.
Chinese Office Action dated Feb. 28, 2014, issued in corresponding Chinese patent application No. 201180054134.
PCT/ISA/237, mailed on Oct. 4, 2011, issued in PCT/JP2011/070281 (English translation).

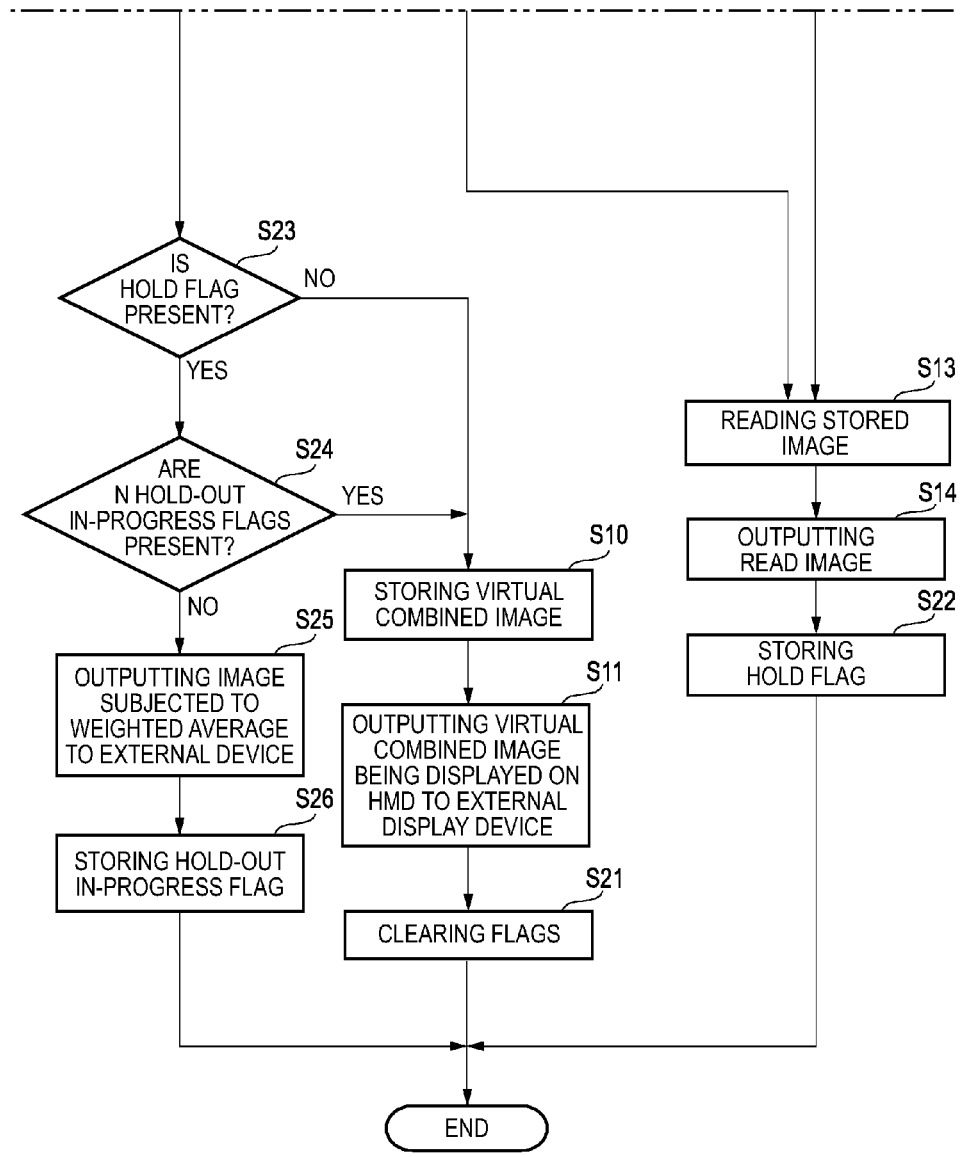
(FIG. 9 Continued)

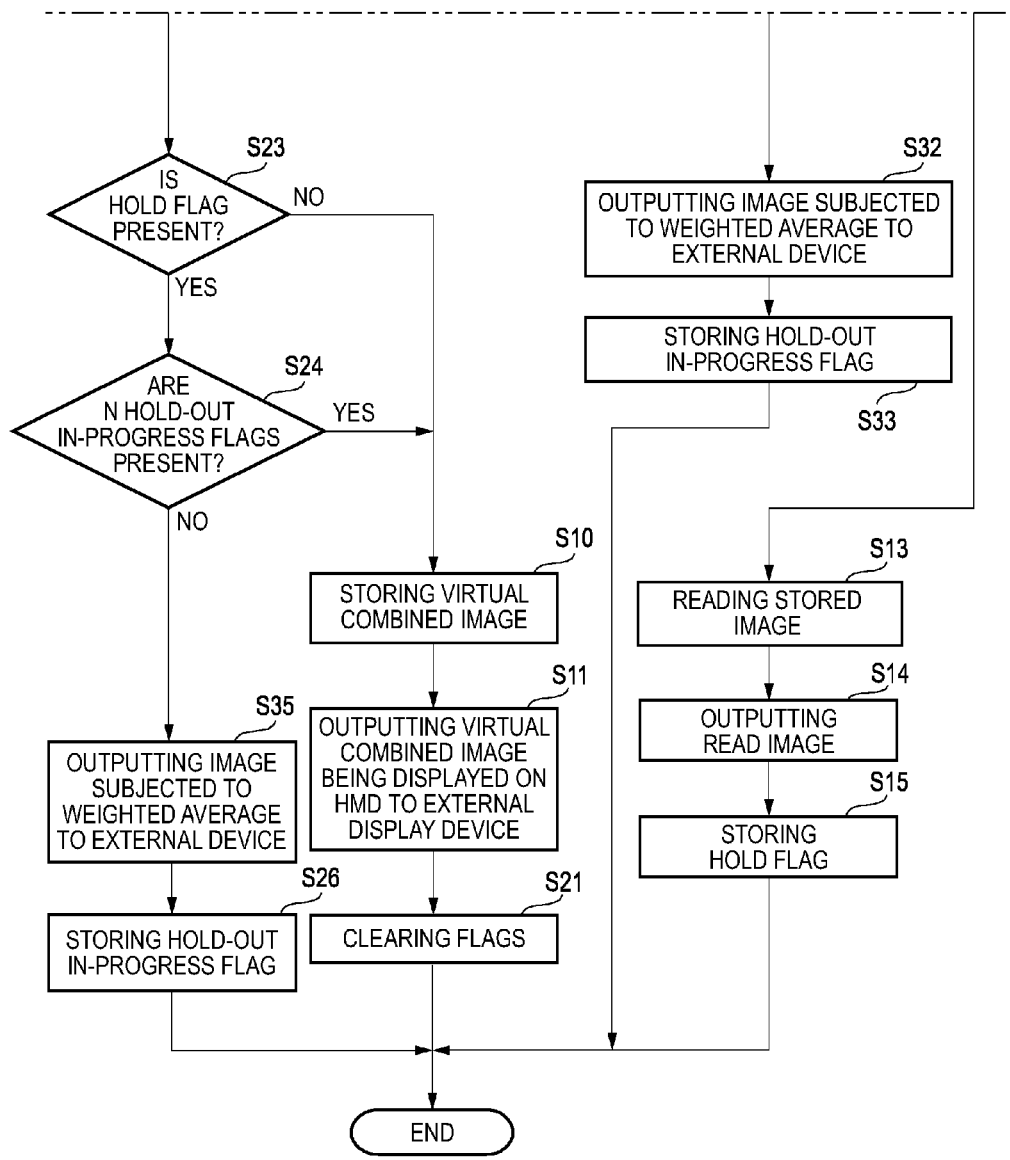

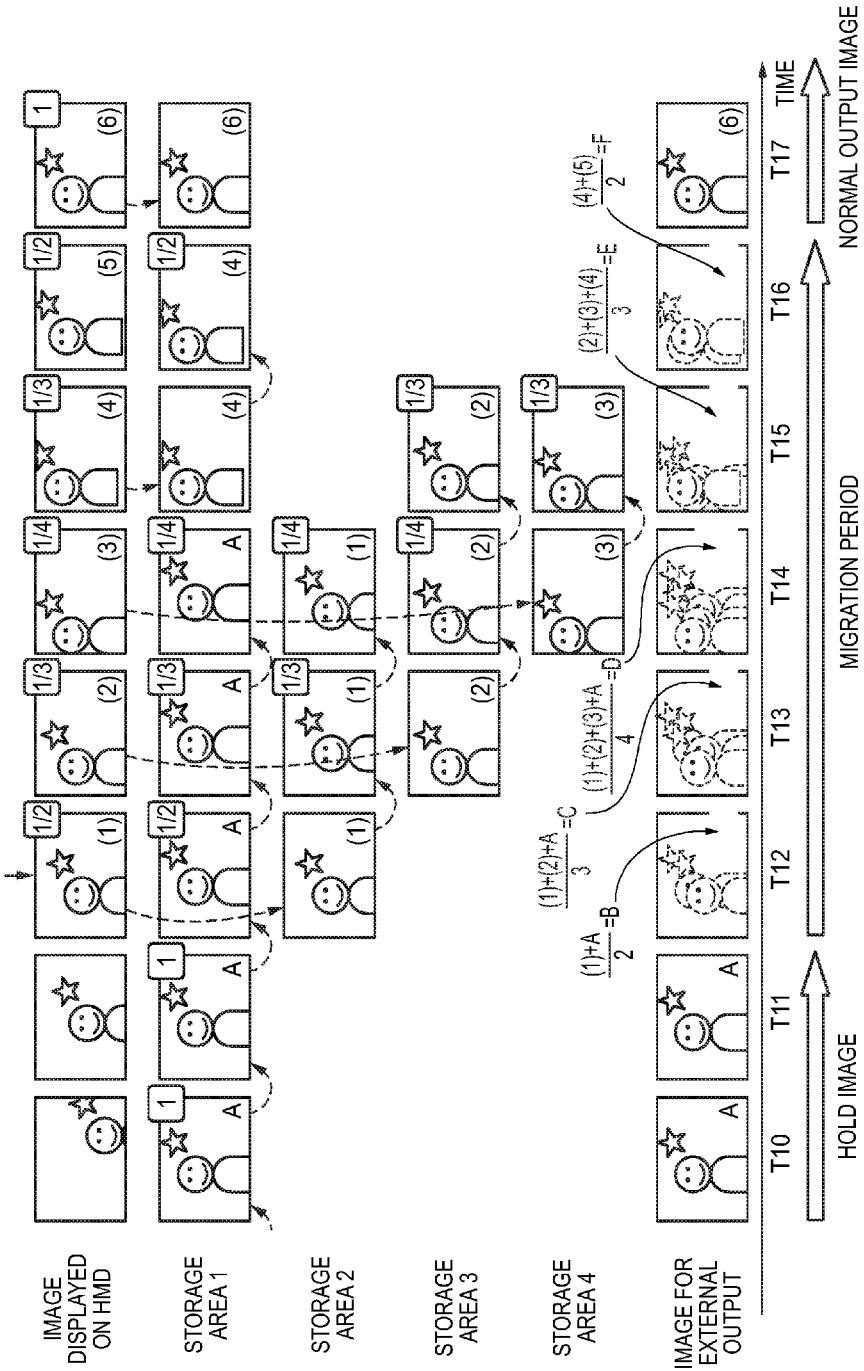

AUGMENTED REALITY PROVIDING APPARATUS

CROSS REFERENCE TO RELATED APPLICATION

This is a continuation of International Application No. PCT/JP2011/070281 filed on Sep. 6, 2011, and claims priority from Japanese Patent Application No. 2010-251304, filed on Nov. 9, 2010, the entire disclosures of which are incorporated herein by reference.

TECHNICAL FIELD

The present invention relates to an augmented reality providing apparatus that provides a user and a third party other than the user with an augmented reality.

BACKGROUND ART

An image display apparatus has been distributed in which a combined image where a virtual object image is superimposed onto an image photographed by a camera (photographed image) is displayed to a display unit to provide a viewer of the display unit with an augmented reality. As for such an apparatus, a device has been known that uses a head-mounted display (HMD) having a camera attached thereto (see, for example, Patent Literature 1).

Patent Literature 1 discloses a system that provides a viewer who wears an HMD having a camera as well as a third party who watches a stationary type display separately provided from the HMD with an augmented reality by the HMD and the display. The system displays a combined image in which a virtual object image is superimposed onto an image photographed by a camera provided on the HMD, transmits the combined image to an external display, and causes the combined image to be displayed on the external display.

In such a system, the viewer who wears the HMD may watch an image that responds to the movement of his head. Therefore, even when an image displayed on the HMD shakes or is tilted, the viewer may not feel a sense of discomfort.

However, since a third party who sees the same image through the display may feel that the image is being changed regardless of his intention, there is a likelihood of causing the third party to feel an image motion sickness. Accordingly, in this system, when a slope is present in an image displayed on the HMD, the slope of the image to be displayed on the display is corrected to provide an image that does not cause a sense of discomfort to a third party.

Also, Patent Literature 2 discloses a method in which a motion vector is calculated from an input image and an image to be output externally is held when either size or direction of the motion vector is large in order to reduce an image motion sickness.

CITATION LIST

Patent Literature

Patent Literature 1: JP-A-2007-299326
Patent Literature 2: JP-A-2010-50645

SUMMARY OF THE INVENTION

Technical Problem

In the system described in Patent Literature 1, when the movement of the head part of the viewer is severe or the like, the reliability of the position measurement information required for combining a virtual object image is reduced so that there may be a case where a combination of the virtual object is failed. As a result, there remains a problem to be solved that a virtual object image is disappeared from or appeared in an image displayed on the HMD or the display to reduce an augmented reality.

In Patent Literature 1, the problems to be solved are not particularly taken into account. Also, since Patent Literature 2 is not related to a technique of providing an augmented reality, there is no description for the above problems.

In a system where an augmented reality can be shared between an HMD and an external display, it is important how to reduce a sense of discomfort of a third party who views the external display, and reducing the sense of discomfort has been insufficient only by the conventional method.

The present invention has been made in consideration of above problems and intends to provide an augmented reality providing apparatus capable of preventing an image motion sickness of a third party from being occurred and preventing a feeling of an augmented reality of a third party from being reduced.

Solution to Problem

A augmented reality providing apparatus of the present invention provided with an image capturing unit that captures an image for each frame period, includes: a global coordinates calculation unit that calculates global coordinates indicating a position on which a virtual object is required to be superimposed in a global coordinate system that defines a virtual space corresponding to a real world, based on a reality image obtained with an image capturing by the image capturing unit; a virtual image combining unit that generates a virtual combined image in which a virtual object image is combined with the reality image using the global coordinates calculated from the global coordinates calculation unit; a display unit that displays any one of the reality image and the virtual combined image; a movement amount detection unit that detects an amount of movement of the augmented reality providing apparatus; and an output control unit that in a frame period (hereinafter, referred to as a first frame period) in which a reliability of the global coordinates calculated by the global coordinates calculation unit is the first threshold or more and an amount of movement detected by the movement amount detection unit is less than the second threshold or more, performs a normal output control that causes the virtual combined image generated by the virtual image combining unit in the first frame period to be output to an external display device provided externally, and in a frame period (hereinafter, referred to as a second frame period) in which the reliability of the global coordinates becomes lower than the first threshold or the amount of movement becomes larger than the second threshold, performs a hold output control that causes the previous virtual combined image having been generated and stored by the virtual image combining unit in a frame period prior to the second frame period to be output to an external display device provided externally.

Advantageous Effects of Invention

According to the present invention, it is possible to provide an augmented reality providing apparatus capable of preventing an image motion sickness from being occurred and a feeling of an augmented reality of a third party from being reduced.

BRIEF DESCRIPTION OF DRAWINGS

FIG. 13 is a state transition diagram for explaining the operation of the second modified example of the HMD 100.

DESCRIPTION OF EMBODIMENTS

Hereinafter, an embodiment of the present invention will be described with reference to the drawings.

Figure 1:
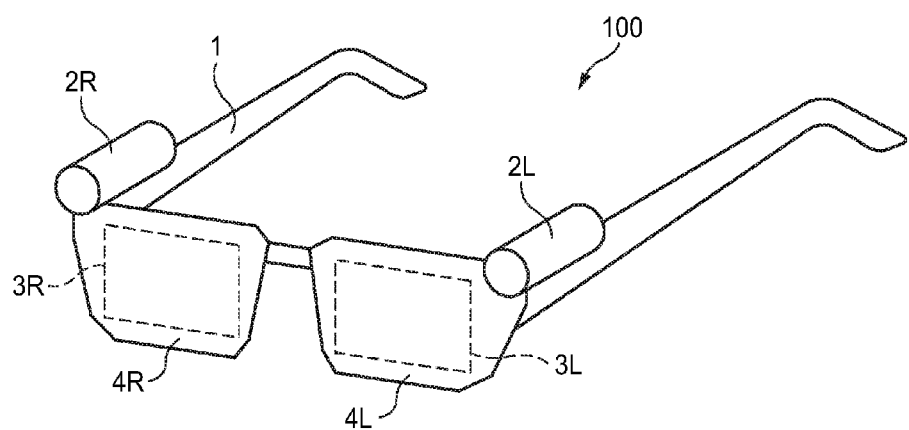
FIG. 1 is a view illustrating an appearance of a head-mounted display (HMD) 100 as an augmented reality providing apparatus for explaining an embodiment of the present invention.

FIG. 1 is a view illustrating an external appearance of a head-mounted display (HMD) 100 as an augmented reality providing apparatus for explaining an embodiment of the present invention.

The HMD 100 illustrated in FIG. 1 includes an eyeglass type case 1, an image capturing unit 2R for right eye and an image capturing unit 2L for left eye provided on the case 1, and a display unit 3R for right eye provided on a portion of case 4R opposed to the right eye of a person who wears the HMD 100, and a display unit 3L for left eye provided on a portion of case 4L opposed to left eye of the person who wears the HMD 100.

Figure 2:
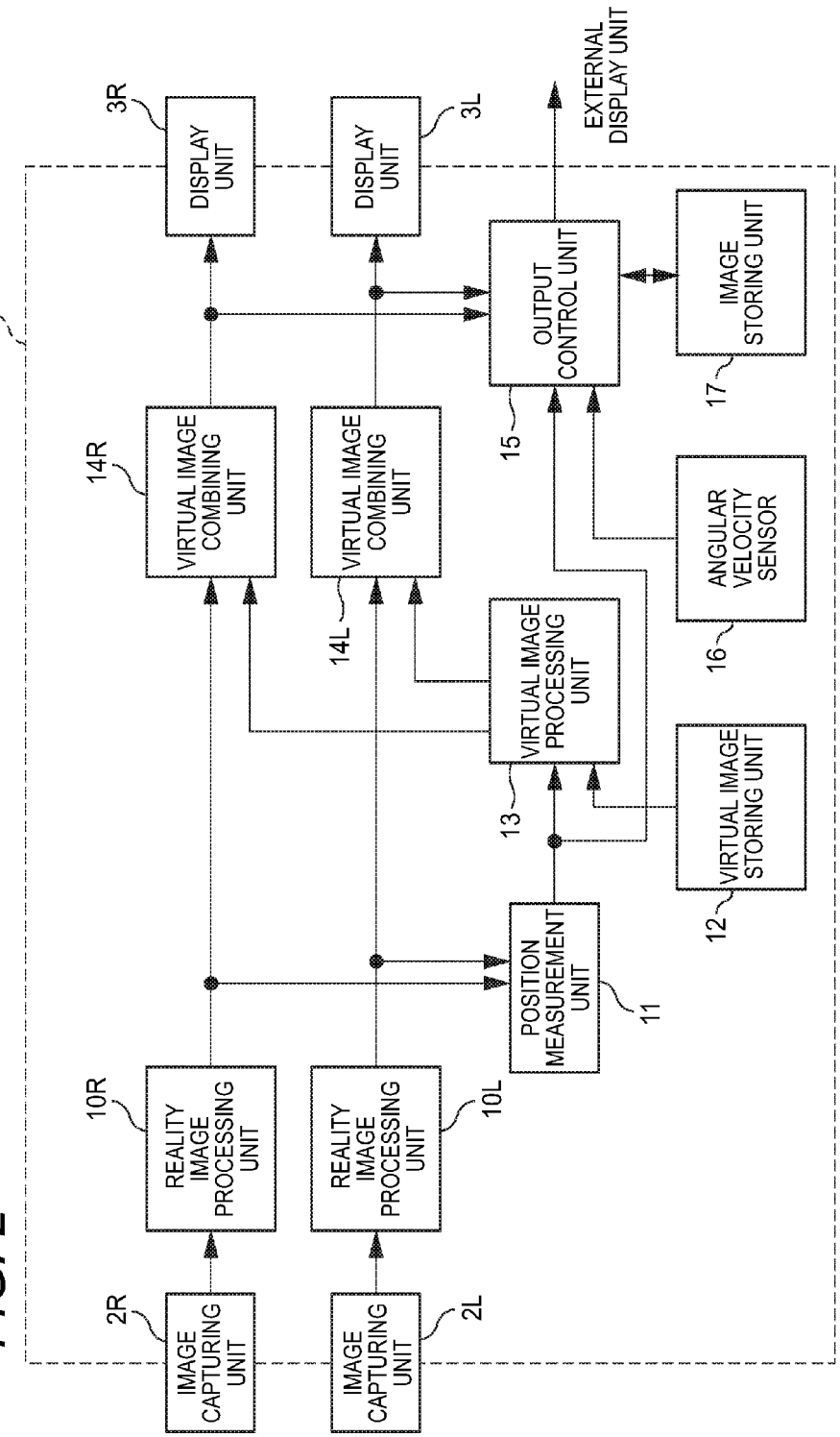
FIG. 2 is a block diagram illustrating an internal configuration of the HMD 100 as illustrated in FIG. 1.

FIG. 2 is a block diagram illustrating an internal configuration of the HMD 100 as illustrated in FIG. 1.

The HMD 100 includes reality image processing units 10R, 10L, a position measurement unit 11, a virtual image storing unit 12, a virtual image processing unit 13, virtual image combining units 14R, 14L, an output control unit 15, an angular velocity sensor 16 that detects an amount of movement of the HMD 100, and an image storing unit 17, in addition to the image capturing units 2R, 2L and the display units 3R, 3L.

The image capturing units 2R, 2L perform an analog processing on a captured image signal that can be obtained by capturing with an image capturing element, digitally converts the captured image signal after the analog processing, and outputs the digitalized captured image signal to the reality image processing units 10R, 10L.

The reality image processing unit 10R performs a well-known digital signal processing on the captured image signal output from the image capturing unit 2R to generate a captured image data for right eye (reality image for right eye).

The reality image processing unit 10L performs a well-known digital signal processing on the captured image signal output from the image capturing unit 2L to generate captured image data for left eye (reality image for left eye).

The position measurement unit 11 uses the reality image for right eye generated by reality image processing unit 10R and the reality image for left eye generated by reality image processing unit 10L to calculate a global coordinates that indicates a position onto which the virtual object is superimposed in a global coordinate system that defines a virtual space corresponding to a real world.

For example, the position measurement unit 11 extracts feature points commonly included in the reality image for right eye and the reality image for left eye, and calculates the global coordinates based on the extracted feature points. Otherwise, the position measurement unit 11 detects markers commonly included in the reality image for right eye and the reality image for left eye, and calculates the global coordinates according to the positions of the detected markers.

The position measurement unit 11 determines whether the calculation accuracy (reliability) of the calculated global coordinates is a first threshold or more along with the calculation of the global coordinates. For example, in a case where the global coordinates are calculated based on the feature points, the number of the feature point is set as an estimation value for estimating the reliability. In a case where the global coordinates are calculated according to the markers, an error sum of squares when the pattern matching is performed is set as an estimation value for estimating the reliability. The position measurement unit 11 inputs a determination result of the reliability into the virtual image processing unit 13 and the output control unit 15.

The virtual image storing unit 12 stores a plurality kinds of three-dimensional virtual object images to be combined to a reality image generated by the reality image processing units 10R, 10L.

The virtual image processing unit 13 makes an arbitrary three-dimensional virtual object image read from the virtual image storing unit 12 into two-dimensional according to the global coordinates calculated in the position measurement unit 11. At this time, the virtual image processing unit 13 performs the two-dimensional operation according to the viewpoint of each of the display units 3R, 3L.

When the reliability of the global coordinates (the same meaning as the estimation value) calculated in the position measurement unit 11 is the first threshold or more, the virtual image processing unit 13 outputs the virtual object image for right eye made into two-dimensional to the virtual image combining unit 14R and outputs the virtual object image for left eye made into two-dimensional to the virtual image combining unit 14L. In the meantime, when the reliability of the global coordinates calculated in the position measurement unit 11 is less than the first threshold, the virtual image processing unit 13 does not output the virtual object image made into two-dimensional to the virtual image combining units 14R, 14L.

When the two-dimensional virtual object image for right eye is input from the virtual image processing unit 13, the virtual image combining unit 14R combines the reality image for right eye output from the reality image processing unit 10R and the virtual object image for right eye, generates a virtual combined image for right eye, and outputs the virtual combined image to the display unit 3R and the output control unit 15. In the meantime, when the two-dimensional virtual object image for right eye is not input from the virtual image processing unit 13, the virtual image combining unit 14R does not generate the virtual combined image, and outputs the virtual combined image to the display unit 3R and the output control unit 15.

When the two-dimensional virtual object image for left eye is input from the image processing unit 13, the virtual image combining unit 14L combines the reality image for left eye output from the reality image processing unit 10L and the virtual object image for left eye, generates a virtual combined image for left eye, and outputs the virtual combined image to the display unit 3L and the output control unit 15. In the meantime, when the two-dimensional virtual object image for left eye is not input from the image processing unit 13, the virtual image combining unit 14L does not generate the virtual combined image, and outputs the virtual combined image to the display unit 3L and the output control unit 15.

The display unit 3R displays the reality image or the virtual combined image output from the virtual image combining unit 14R.

The display unit 3L displays the reality image or the virtual combined image output from the virtual image combining unit 14L.

The output control unit 15 outputs the virtual combined image to an external display device provided externally to the HMD 100. The external display device is configured to display an image for right eye and an image for left eye in order for a viewer to see a stereoscopic image.

The output control unit 15 stores the virtual combined image output to the external display device in the image storing unit 17. Only the latest virtual combined image is overwritten and stored in the image storing unit 17. When it is determined to be necessary based on the amount of movement of HMD 100 detected by the angular velocity sensor 16, the output control unit 15 stops overwriting (updating) for the virtual combined image stored in the image storing unit 17.

The output control unit 15 performs a switchable operation between a normal output control that causes the virtual combined image generated by the virtual image combining units 14R, 14L to be output to the external display device and a hold output control that causes the virtual combined image stored in the image storing unit 17 to be output to the external display device based on the determination result of the global coordinates reliability by the position measurement unit 11 and the amount of movement of HMD 100 detected by the angular velocity sensor 16.

Figure 3:
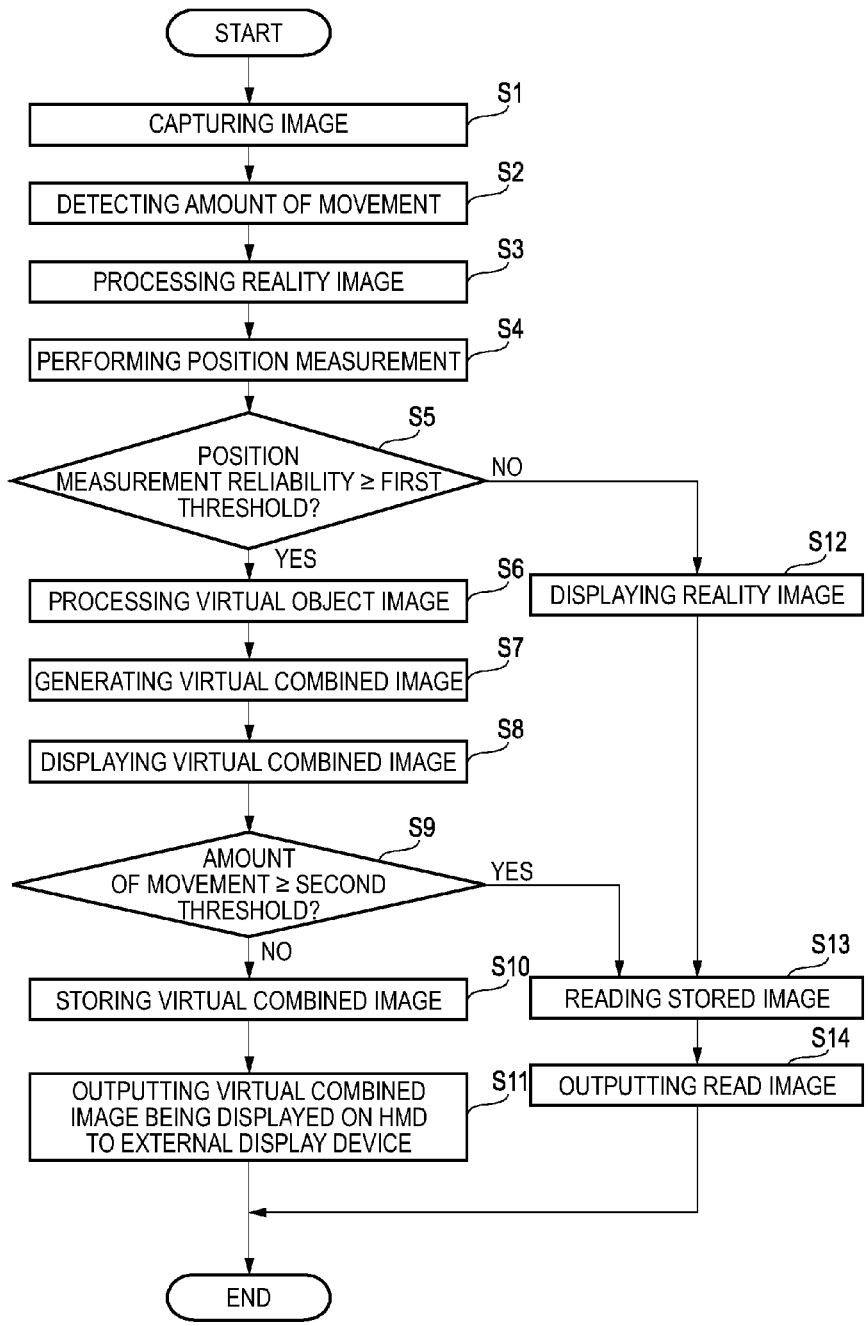
FIG. 3 is a flow chart for explaining the operation of the HMD 100 during a single frame period of the HMD 100 as illustrated in FIG. 1.

FIG. 3 is a flow chart for explaining the operation of the HMD 100 during a single frame period as illustrated in FIG. 1.

At step S1, when images are captured by the image capturing units 2R, 2L, the output control unit 15 detects the amount of movement (amount of movement between the current frame period and one previous frame period) of HMD 100 using information from the angular velocity sensor 16 (step S2).

Subsequently, the captured image data (reality image) output from each of the capturing units 2R, 2L is generated in the reality image processing units 10R, 10L (step S3).

Subsequently, the global coordinates calculation is performed (position measurement) based on the two reality images generated at step S3 in the position measurement unit 11 (step S4).

Subsequently, a determination of the global coordinates reliability (position measurement reliability) is performed in the position measurement unit 11. When the position measurement reliability is the first threshold or more ("YES" at step S5), the process after step S6 is performed, and when the position measurement reliability is less than the first threshold ("NO" at step S5), the process after step S12 is performed.

At step S6, the virtual object image is made into two-dimensional according to the global coordinates calculated at step S4, a virtual combined image in which the two-dimensional virtual object image and the reality image generated at step S3 are combined is generated (step S7), and the virtual combined image is displayed on the display units 3R, 3L (step S8).

After step S8, the output control unit 15 determines whether the amount of movement detected at step S2 is a second threshold or more, performs step S13 when the amount of movement is the second threshold or more, and performs step S10 when the amount of movement is less than the second threshold.

At step S6, the output control unit 15 stores the virtual combined image displayed on the display units 3R, 3L at step S8 in the image storing unit 17 (the virtual combined image stored in the image storing unit 17 is overwritten to be updated). Thereafter, the output control unit 15 outputs the virtual combined image displayed on the display units 3R, 3L at step S8 to the external display device (step S11), and terminates the process during a single frame period.

At step S13, the output control unit 15 does not store the virtual combined image displayed on the display units 3R, 3L at step S8 in the image storing unit 17 (does not perform updating of the virtual combined image stored in the image storing unit 17), reads the virtual combined image stored in the image storing unit 17 and then, outputs the read virtual combined image to the external display device (step S14), thereby terminating the process during a single frame period.

Returning to the description of step S5, when the position measurement reliability is less than the first threshold ("NO" at step S5), the reality image generated at step S3 is displayed on the display units 3R, 3L (step S12). After step S12, step S13 and step S14 are performed and the virtual combined image stored in the image storing unit 17 is displayed on the external display device.

While the above-description explains the operation during a single frame period of the HMD 100, the operation over plurality of frame periods of the HMD 100 will be described below with reference to FIG. 4 to FIG. 7.

Figure 4:
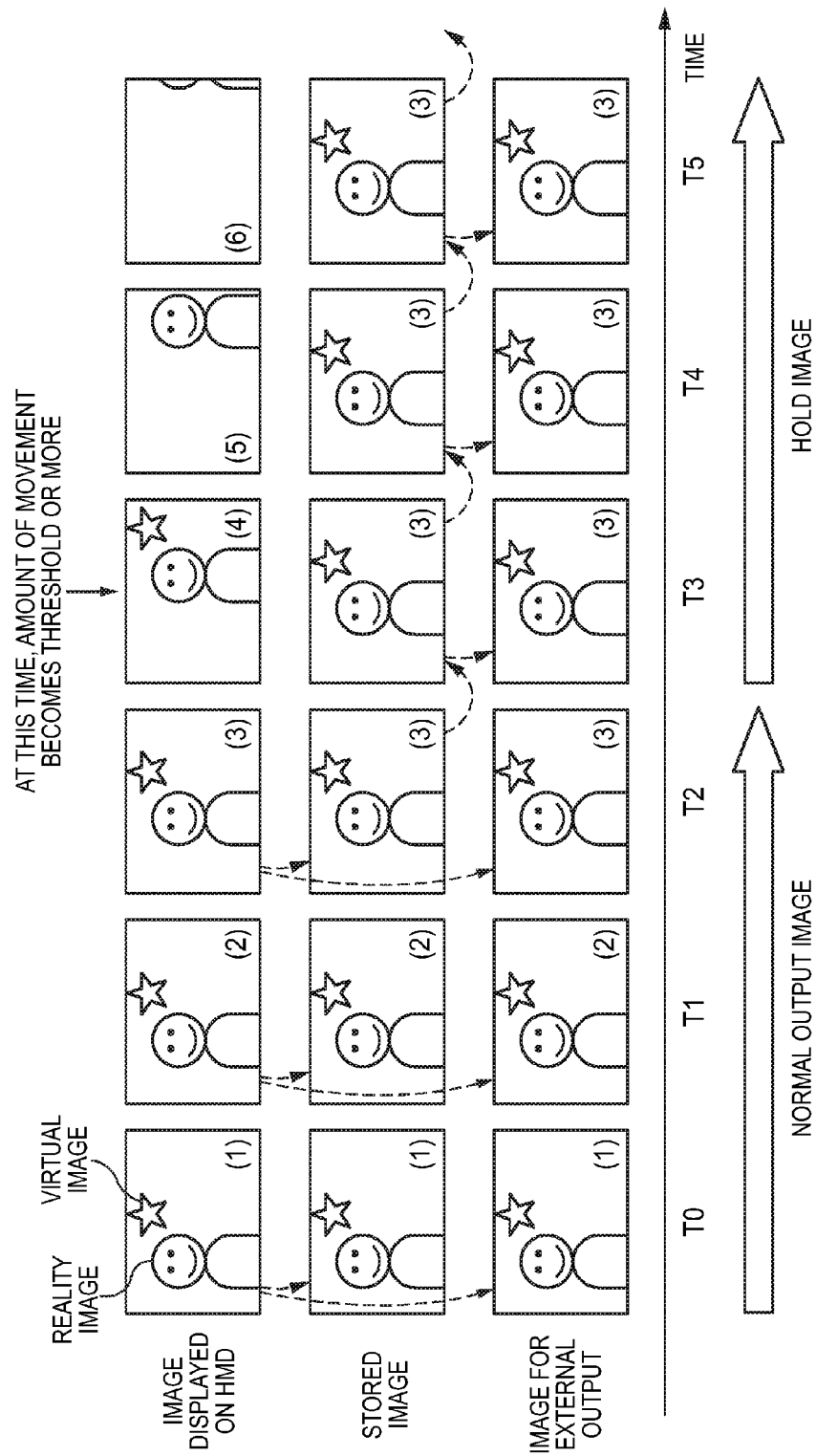
FIG. 4 is a state transition diagram for explaining the operation of the HMD 100 as illustrated in FIG. 1.

FIG. 4 is a state transition diagram for explaining the operation of the HMD 100 as illustrated in FIG. 1. FIG. 4 illustrates operations for a state transition from a state where the position measurement reliability is the first threshold or more and the amount of movement is less than the second threshold to a state where the position measurement reliability is the first threshold or more and the amount of movement is the second threshold or more.

In FIG. 4, the axis of abscissas indicates a start time of a frame period. Above_each of times T0 to T5, a virtual combined image (image being displayed on the HMD) being displayed on the display unit 3R, a virtual combined image (stored image) stored in the image storing unit 17, and an image for external output being output on an external display device after a frame period started at each time is completed, are illustrated.

In FIG. 4, reference numerals are denoted in each image being displayed on the HMD, the stored image, and the image for external output, and the same numerals are given to the same image. Additionally, only an image corresponding to right eye is illustrated in FIG. 4.

In the frame periods started at each of times T0 to T2, since the amount of movement of the HMD 100 is less than the second threshold, the virtual combined image generated after images are captured is displayed on the display unit 3R, the virtual combined image is output to the external display device (normal output control is performed), and the virtual combined image is stored in the image storing unit 17.

Accordingly, during the time period of T0 to T2, the same image as the image displayed on the display unit of the HMD 100 is displayed on the external display device, such that the person who wears the HMD 100 and the person who views the external display device can share an augmented reality in which a virtual image of the star is superimposed onto a reality image of a person.

When the amount of movement of the HMD 100 is the second threshold or more at time T3, in the frame period started at time T3, the virtual combined image 4 generated after images are captured is displayed on the display unit 3R, but the virtual combined image 4 is not output to the external display device. Instead, the stored image 3 stored in the image storing unit 17 is output to the external display device (the hold output control is performed).

Also, at times T4 and T5, since the amount of movement of the HMD 100 is not less than the second threshold, the stored image 3 is output to the external display device (the hold output control is performed).

Accordingly, after time T3, the virtual combined images 4 to 6 are sequentially switched and displayed on the display unit of the HMD 100, but the virtual combined image 3 that was being displayed directly before the movement of the HMD 100 reaches the second threshold or more is continued to be displayed on the external display device. Therefore, the person who views the external display device is allowed to pass images, such as the virtual combined images 4 to 6 that are largely changed, such that the occurrence of the image motion sickness can be prevented.

Figure 5:
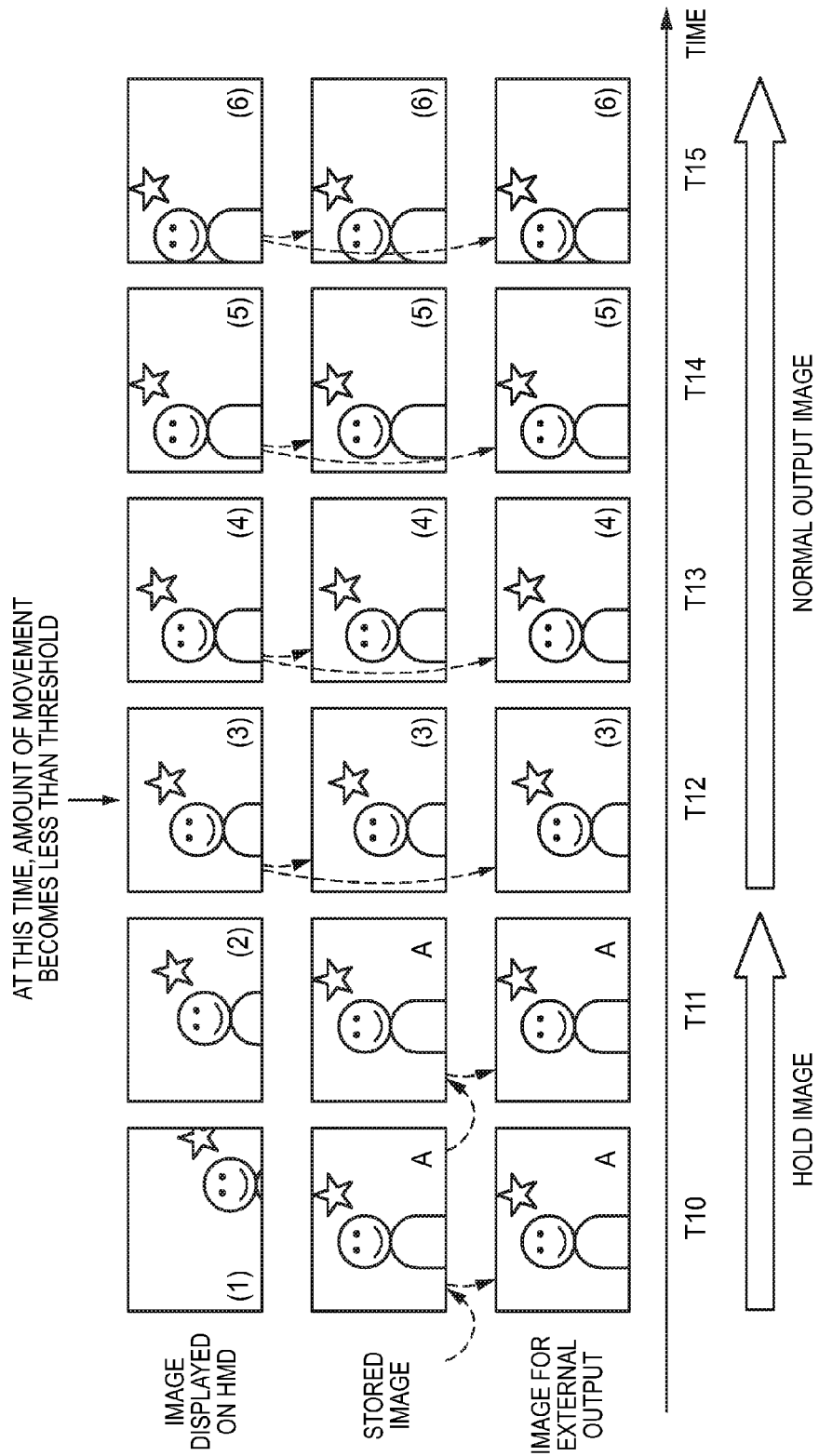
FIG. 5 is a state transition diagram for explaining the operation of the HMD 100 as illustrated in FIG. 1.

FIG. 5 is a state transition diagram for explaining the operation of the HMD 100 as illustrated in FIG. 1. FIG. 5 illustrates operations for a state transition from a state where the position measurement reliability is the first threshold or more and the amount of movement is the second threshold or more to a state where the position measurement reliability is the first threshold or more and the amount of movement is less than the second threshold. The denotations represented in FIG. 5 are the same as those represented in FIG. 4.

In the frame periods started at each of times T10 and T11, since the amount of movement of the HMD 100 is the second threshold or more, the virtual combined image generated after images are captured is displayed on the display unit 3R. However, the virtual combined image is not output to the external display device and instead, a stored image A stored in the image storing unit 17 is output to the external display device (the hold output control is performed).

When the amount of movement of the HMD 100 is less than the second threshold at time T12, in the frame period started at time T12, the virtual combined image 3 generated after images are captured is displayed on the display unit 3R, the virtual combined image 3 is output to the external display device (the normal output control is performed), and the virtual combined image 3 is stored in the image storing unit 17.

Also, at each of times T13 to T15, since the amount of movement of the HMD 100 is less than the second threshold, the virtual combined images 4 to 6 generated in each frame period are output to the external display device (the normal output control is performed).

As such, even after the images output to the external display device are held, when the amount of movement of HMD 100 becomes smaller, the same virtual combined image as that being displayed in HMD 100 can be displayed on the external display device.

Figure 6:
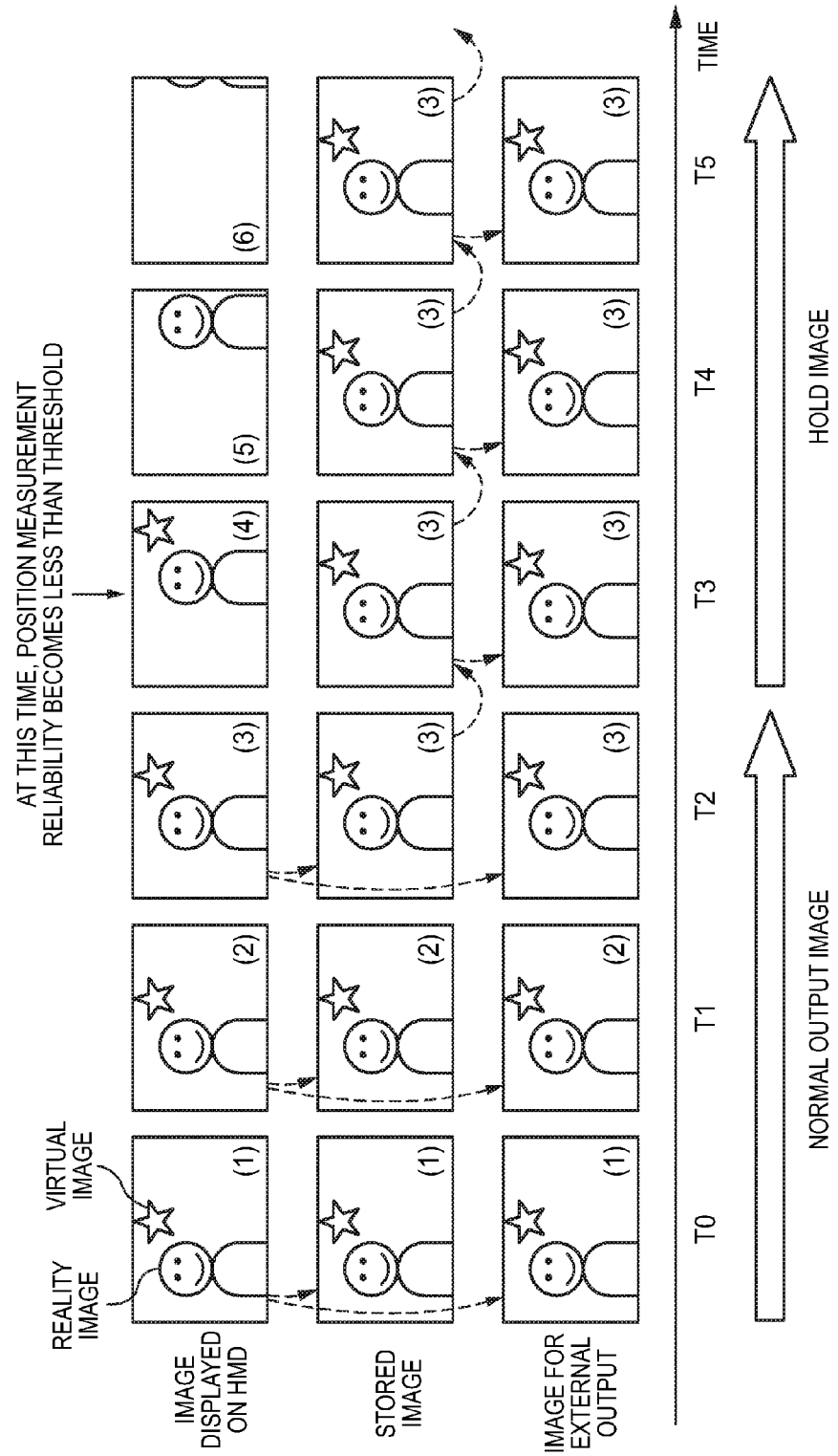
FIG. 6 is a state transition diagram for explaining the operation of the HMD 100 as illustrated in FIG. 1.

FIG. 6 is a state transition diagram for explaining the operation of the HMD 100 as illustrated in FIG. 1. FIG. 6 illustrates operations for a state transition from a state where the position measurement reliability is the first threshold or more and the amount of movement is less than the second threshold to a state where the position measurement reliability is less than the first threshold. The denotations represented in FIG. 6 are the same as those represented in FIG. 4.

In the frame periods started at each of times T0 to T2, since the position measurement reliability is the second threshold or more, the virtual combined image generated after images are captured is displayed on the display unit 3R, the virtual combined image is output to the external display device (the normal output control is performed), and the virtual combined image is stored in the image storing unit 17.

Accordingly, during times T0 to T2, the same image as image displayed on the display unit of the HMD 100 is displayed on the external display device, such that the person who wears the HMD 100 and the person who views the external display device can share an augmented reality in which a virtual image of the star is superimposed onto a reality image of the person.

When the position measurement reliability is less than the first threshold at time T3, in the frame period started at time T3, the reality image 4 generated after images are captured is displayed on the display unit 3R, but the reality image 4 is not output to the external display device. Instead, the stored image 3 stored in the image storing unit 17 is output to the external display device (the hold output control is performed).

Also, at times T4 and T5, since the position measurement reliability is not less than the first threshold, the stored image 3 is output to the external display device (the hold output control is performed).

Accordingly, after time T3, the reality images 4 to 6 are sequentially switched and displayed on the display unit of the HMD 100, but the virtual combined image 3 that was being displayed directly before the position measurement reliability becomes less than the first threshold is continued to be displayed on the external display device.

Due to these operations, a situation where the virtual image of the star being displayed on the external display device is frequently disappeared suddenly after time T3 is cleared. According to this, it is possible to prevent the person who views the external display device from being felt the reduction of the augmented reality due to a sudden disappearance of the virtual image. Further, the person who wears the HMD 100 can secure the field of view by the reality image displayed on the display units 3R, 3L, so that safety can be assured.

Figure 7:
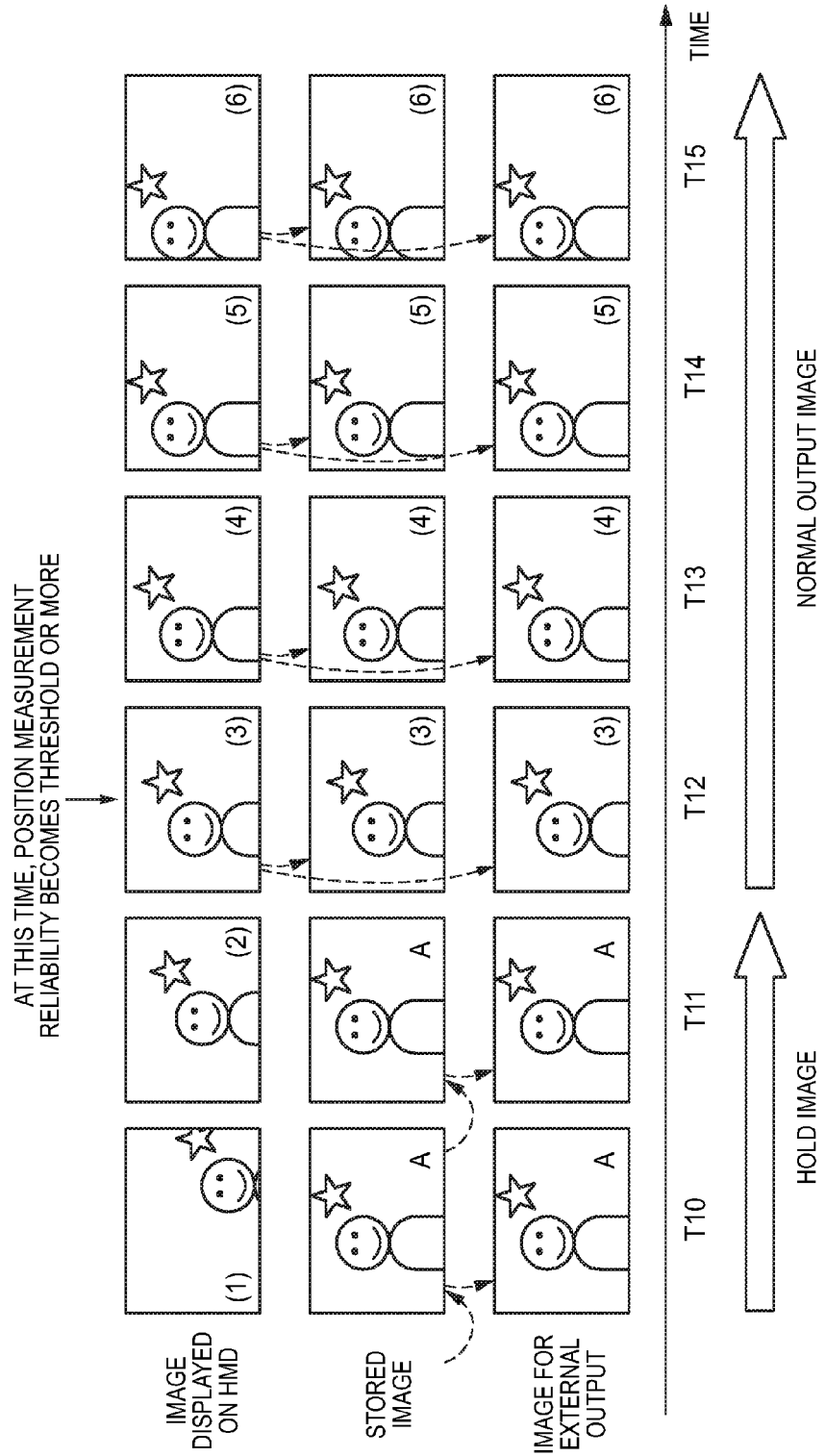
FIG. 7 is a state transition diagram for explaining the operation of the HMD 100 as illustrated in FIG. 1.

FIG. 7 is a state transition diagram for explaining the operation of the HMD 100 as illustrated in FIG. 1. FIG. 7 illustrates operations for a state transition from a state where the position measurement reliability is less than the first to a state where the position measurement reliability is the first threshold or more and the amount of movement is less than the second threshold. The denotations represented in FIG. 7 are the same as those represented in FIG. 4.

In the frame periods started at each of times T10 to T11, since the position measurement reliability is less than the first threshold, the reality image generated after images are captured is displayed on the display unit 3R, but the reality image is not output to the external display device. Instead, a stored image A stored in the image storing unit 17 is output to the external display device (the hold output control is performed).

When the position measurement reliability is either the second threshold or more at time T12 and the amount of movement is less than the second threshold, in the frame period started at time T12, the virtual combined image 3 generated after images are captured is displayed on the display unit 3R, the virtual combined image 3 is output to the external display device (the normal output control is performed), and the virtual combined image 3 is stored in the image storing unit 17.

Also, at each of times T13 to T15, since the position measurement reliability is the first threshold or more and the amount of movement is less than the second threshold, the virtual combined images 4 to 6 generated in each frame period are output to the external display device (the normal output control is performed).

As described above, according to the HMD 100, when the position measurement reliability is the first threshold or more and the amount of movement of the HMD 100 is less than the second threshold, the output control unit 15 performs the normal output control. For this reason, in this case, the augmented reality can be shared between the person who wears the HMD 100 and the person who views the external display device.

Further, according to the HMD 100, when the generation of the virtual combined image is unlikely to be successful in a case where the position measurement reliability is less than the first threshold irrespective of the amount of movement, the output control unit 15 performs the hold output control. For this reason, also in this case, the virtual combined image being stored in the image storing unit 17 is continued to be displayed on the external display device. As a result, it is possible to prevent the reduction of a feeling of an augmented reality that would be given to the person who views the external display device.

Further, according to the HMD 100, when the amount of movement of the HMD 100 is the second threshold or more even if the position measurement reliability is the first threshold or more, the output control unit 15 performs the hold output control such that the virtual combined image being stored in the image storing unit 17 is continued to be displayed on the external display device. As a result, it is possible to prevent the person who views the external display device from being undergone to the image motion sickness.

Hereinafter, a modified example of the HMD 100 will be described.

FIRST MODIFIED EXAMPLE

An internal block configuration of the first modified example of the HMD 100 is the same as that illustrated in FIG. 2, except for the difference in the configuration of the output control unit 15.

Figure 8:
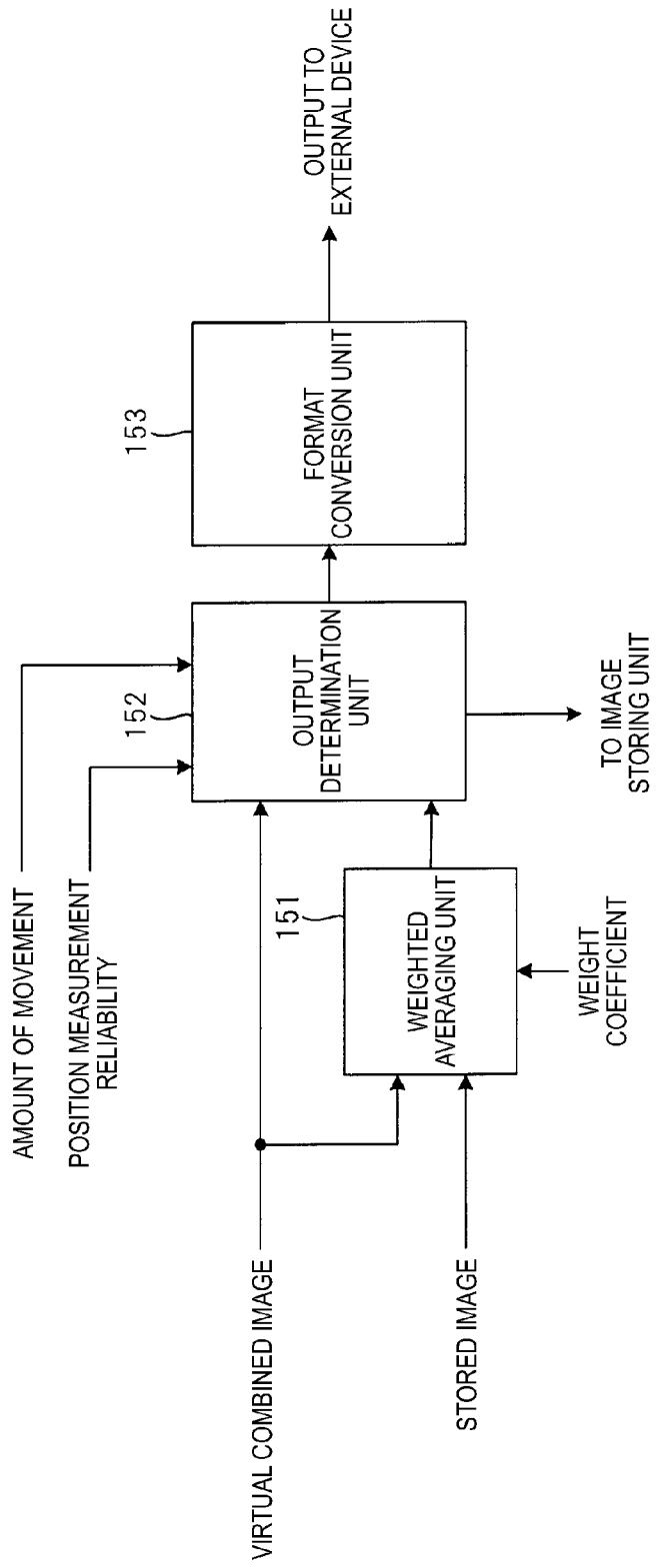
FIG. 8 is a block diagram illustrating an internal configuration of an output control unit 15 in a first modified example of the HMD 100.

FIG. 8 is a block diagram illustrating an internal configuration of an output control unit 15 in a first modified example of the HMD 100.

The output control unit 15 illustrated in FIG. 8 includes a weighted averaging unit 151, determination unit 152 and a format conversion unit 153.

The weighted averaging unit 151 performs a weighted average for the virtual combined image (image being displayed on the HMD) generated in the virtual image combining units 14R, 14L and the virtual combined image (stored image) stored in the image storing unit 17 to generate an image for external output to be output to the external display device. Specifically, an operation of $\{(\text{image being displayed on the HMD})\times\alpha+(\text{stored image})\times\beta\}/(\alpha+\beta)$ is performed to generate the image for an external output.

The output determination unit 152 performs a switchable operation among three kinds of controls based on a determination result of the position measurement reliability from the position measurement unit 11 and the amount of movement of the HMD 100 detected by the angular velocity sensor 16. A first kind of control is a normal output control that causes the virtual combined image generated by the virtual image combining unit 14R, 14L to be output to the external display device through the format conversion unit 153. A second kind of control is a hold output control that causes the virtual combined image stored in the image storing unit 17 to be output to the external display device through the format conversion unit 153. A third kind of control is a migration output control that causes the image for external output generated in the weighted averaging unit 151 to be output to the external display device.

When the hold output control is performed, the output determination unit 152 stores a hold flag that indicates the displaying of the external display device is fixed (hold) in the internal memory. Further, when the normal output control is performed, the output determination unit 152 clears all flags stored in the internal memory. Still further, when the migration output control is performed, the output determination unit 152 stores a hold-out in-progress flag indicating that the external display device is being migrated from a fixed display to a normal display. The output determination unit 152 increases the number of the hold-out in-progress flags each time when the migration output control is performed. The output determination unit 152 does not increase the number of the hold flags each time when the normal output control is performed.

The format conversion unit 153 converts an input image into data for an external display device and transmits the input image to the external display device.

Figure 9:
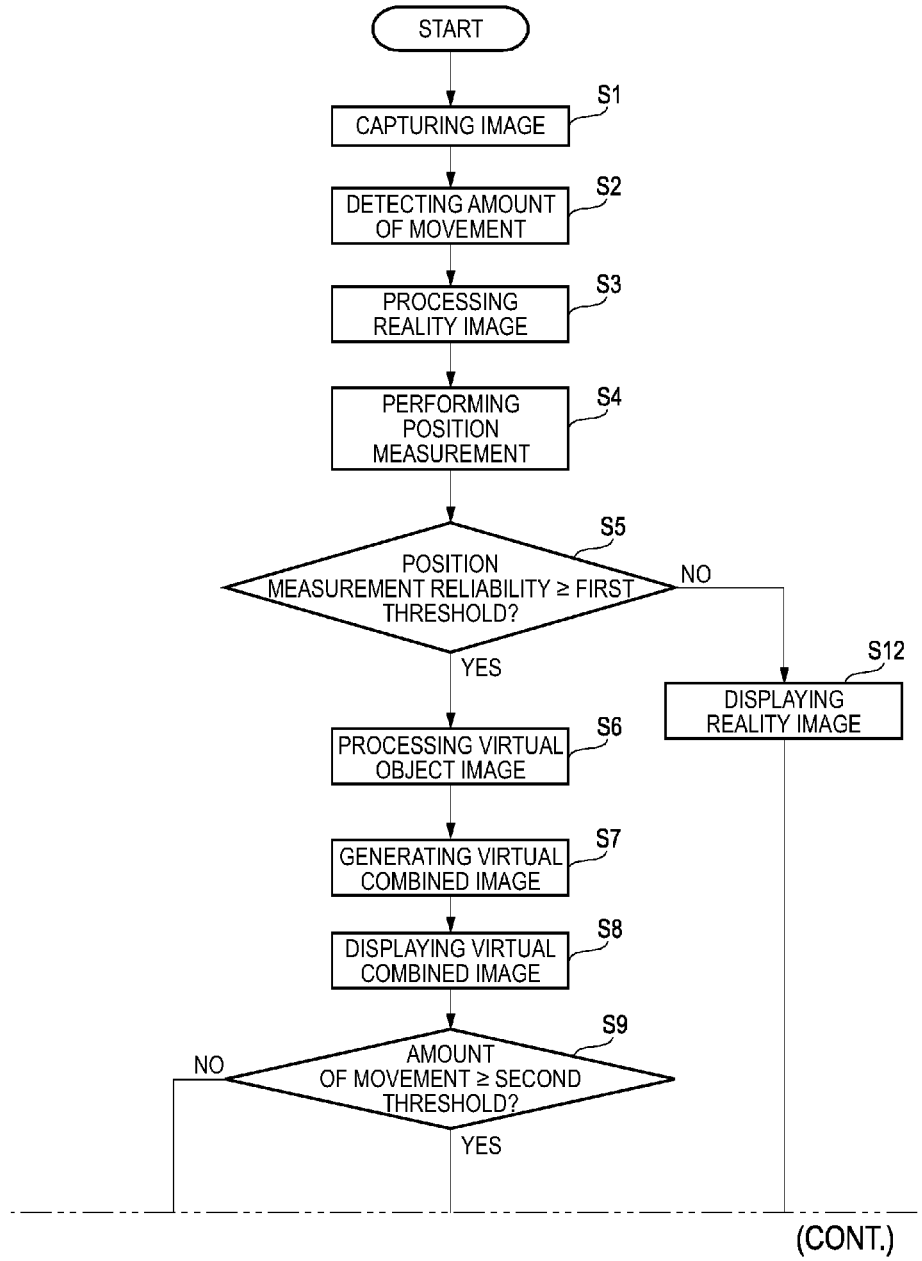
FIG. 9 is a flow chart for explaining the operation during a single frame period of the first modified example of the HMD 100.

FIG. 9 is a flow chart for explaining the operation of the first modified example of the HMD 100 during a single frame period. In FIG. 9, the same numerals are given to the same processing as those of FIG. 3. The processing of step S9, step S10, step S11, step S13, and step S14 are performed by the output determination unit 152.

After step S14, the output determination unit 152 stores the hold flag in the internal memory (step S22), and then ends the process. Further, after step S11, the output determination unit 152 clears all the flags stored in the internal memory (step S21), and then ends the process.

In the determination at step S9, when the amount of movement of the HMD 100 is less than the second threshold ("NO" at step S9), the output determination unit 152 determines whether the hold flag is stored in the internal memory (step S23). If the hold flag is not stored therein, the output determination unit 152 performs a processing of step S10. If the hold flag is stored therein, the output determination unit 152 performs a processing of step S24.

At step S24, the output determination unit 152 determines whether n (n is a natural number equal to or greater than 1) hold-out in-progress flags are stored in the internal memory.

Subsequently, when the n hold-out in-progress flags are present, the output determination unit 152 performs a processing of step S10. When the number of hold-out in-progress flags are less than n, the output determination unit 152 performs a processing of step S25 (migration output control).

At step S25, the output determination unit 152 causes an image for an external output formed by performing a weighted average for the virtual combined image being displayed at step S8 and the virtual combined image stored in the image storing unit 17 to be generated in the weighted averaging unit 151, causes the image for the external output to be undergone a format conversion in the format conversion unit 153, and then outputs the image for the external output to the external display device.

When step S25 is ended, the output determination unit 152 stores a single hold-out in-progress flag in the internal memory (step S26), and ends the process.

The operations performed during one frame period of the first modified example of the HMD 100 are described as above. Hereinafter, operations over a plurality of frame periods of the first modified example of the HMD 100 will be described with reference to FIG. 10.

Figure 10:
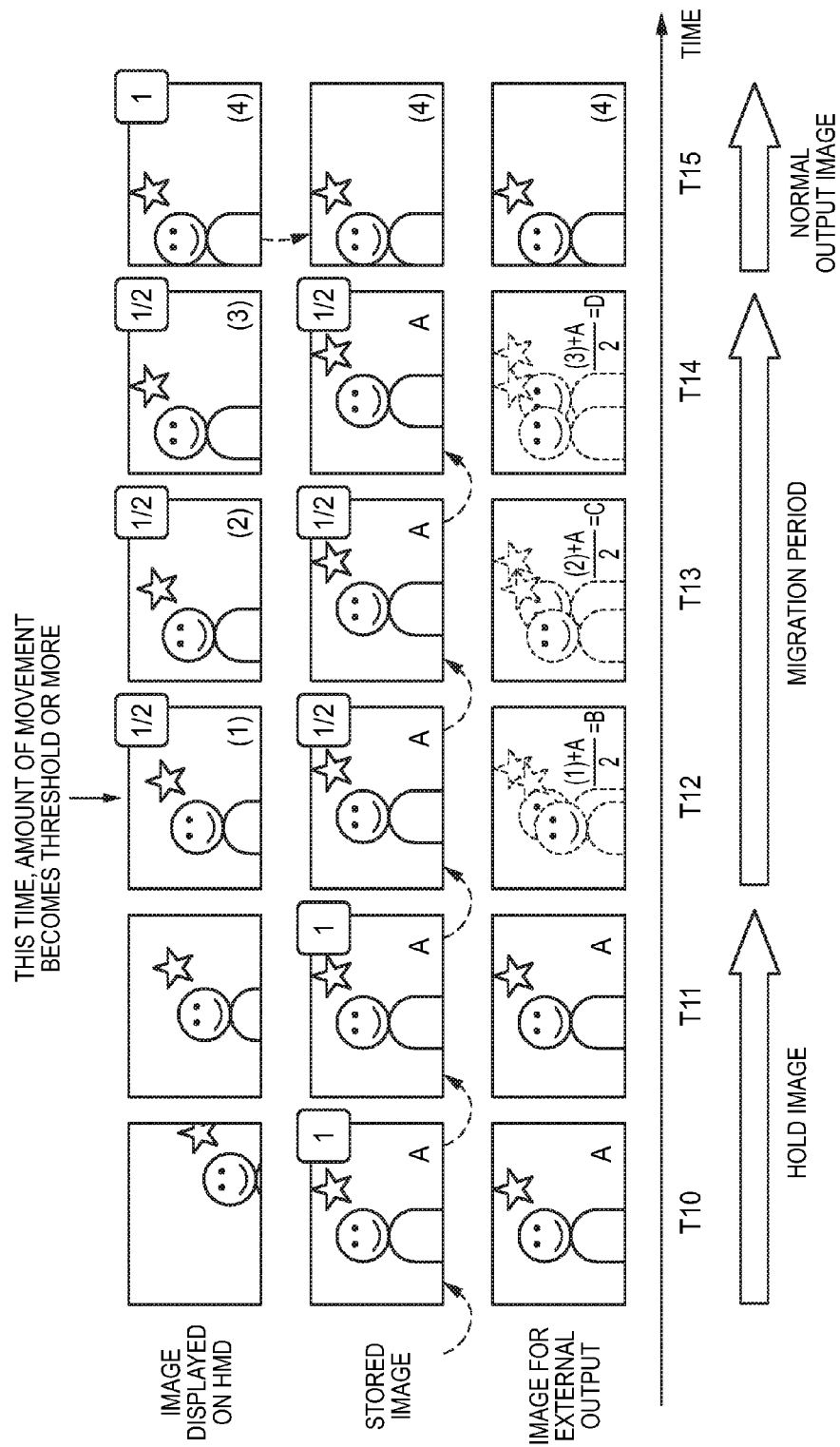
FIG. 10 is a state transition diagram for explaining the operation of the first modified example of the HMD 100.

FIG. 10 is a state transition diagram for explaining the operation of the first modified example of the HMD 100. FIG. 10 illustrates operations for a state transition from a state where the position measurement reliability is the first threshold or more and the amount of movement is the second threshold or more to a state where the position measurement reliability is the first threshold or more and the amount of movement is less than the second threshold.

Additionally, the denotations represented in FIG. 10 are the same as those represented in FIG. 4. Further, only an image corresponding to right eye is illustrated in FIG. 10. An operation when n=3 and a weight coefficient α, β=½ is illustrated in FIG. 10.

Further, a state transition from a state where the position measurement reliability is less than the first threshold to a state where the position measurement reliability is the first threshold or more and the amount of movement is less than the second threshold corresponds to a state transition where a difference between FIG. 4 and FIG. 10 is only a situation that at time T12, the position measurement reliability becomes the first threshold or more and the amount of movement becomes less than the second threshold, and the image being displayed on the HMD at times T10, 11 becomes not the virtual combined images but the reality images, and their basic operations are equal.

Further, operations for a state transition from a state where the position measurement reliability is the first threshold or more and the amount of movement is less than the second threshold to a state where the position measurement reliability is less than the first threshold and the amount of movement is the second threshold or more are the same as those illustrated in FIG. 4 and FIG. 6.

In the frame periods started at each of times T10 and T11, since the amount of movement of the HMD 100 is the second threshold or more, the virtual combined image generated after images are captured is displayed on the display unit 3R, but the virtual combined image is not output to the external display device and a stored image A stored in the image storing unit 17 is output to the external display device (the hold output control is performed) instead of the virtual combined image. After the frame periods started at each of times T10, T11 are ended, only the hold flag is stored in the internal memory of the output determination unit 152.

When the amount of movement of the HMD 100 is less than the second threshold at time T12, at time T12, the hold flag is stored, but none of hold-out in-progress flags is stored in the internal memory of the output determination unit 152. For this reason, in a frame period started at time T12, an image B generated by adding the virtual combined image (1) being displayed on the HMD and the virtual combined image A stored in the image storing unit 17 and dividing the sum of them by 2 is output to the external display device (a first migration output control is performed). When the image B is output to the external display device, one hold-out in-progress flag is stored in the internal memory of the output determination unit 152.

At next time T3, the hold flag and one hold-out in-progress flag have been stored in the internal memory of the output determination unit 152.

or this reason, in a frame period started at time T13, an image C generated by adding the virtual combined image (2) being displayed on the HMD and the virtual combined image A stored in the image storing unit 17 and dividing the sum of them by 2 is output to the external display device (a second migration output control is performed).

When the image C is output to the external display device, one hold-out in-progress flag is added in the internal memory of the output determination unit 152.

At next time T14, the hold flag and two hold-out in-progress flags are stored in the internal memory of the output determination unit 152.

For this reason, in a frame period started at time T14, an image D generated by adding the virtual combined image (3) being displayed on the HMD and the virtual combined image A stored in the image storing unit 17 and dividing the sum of them by 2 is output to the external display device (a third migration output control is performed).

When the image D is output to the external display device, one hold-out in-progress flag is added in the internal memory of the output determination unit 152.

At next time T15, the hold flag and three (equals to n) hold-out in-progress flags have been stored in the internal memory of the output determination unit 152.

For this reason, in a frame period started at time T15, the virtual combined image (4) being displayed on the HMD is overwritten into the image storing unit 17, and the virtual combined image (4) is output to the external display device (the normal output control is performed).

When the virtual combined image (4) is output to the external display device, all the hold flag and hold-out in-progress flags stored in the internal memory of the output determination unit 152 are cleared. For this reason, after time T15, the virtual combined image being displayed on the HMD is displayed on the external display device as it is.

As such, in the first modified example, when a state transition from a state where the amount of movement of the HMD is the second threshold or more is changed to a state where the amount of movement of the HMD is less than the second threshold is occurred, a control performed by the output control unit 15 is not directly switched from the hold output control to the normal output control but switched to the normal output control after the migration output control that causes the image for external output obtained by performing the weighted average for the virtual combined image generated in the image combining units 14R, 14L and the virtual combined image stored in the image storing unit 17 to be output to the external display device is performed n times.

By performing the migration output control, an image to be displayed on the external display device is not changed abruptly from the virtual combined image A to the virtual combined image (4) but can be gradually changed from the virtual combined image A to the virtual combined image (4).

For this reason, it is possible to prevent an image stimulus due to a large change of image from being given to the person who views the external display device. Further, the images B, C, D displayed on the external display device during the migration output control, as illustrated in FIG. 10, becomes completely different images in appearance from the images A, 4 displayed during the hold output control and the normal output control, so that it becomes easy to know the timing of return from a hold state to a normal state.

Further, in the description as described above, weight coefficients used in the weighted averaging unit 151 are made to be the same by performing the migration output control n times, but is not limited thereto.

For example, the weight coefficient of the virtual combined image being displayed on the HMD may be increased in proportional to the number of being held-put flags stored in the internal memory of the output determination unit 152.

Specifically, in a frame period started at time T13 of FIG. 10, the weight coefficient of the image being displayed on the HMD is set to two thirds (2/3) and the weight coefficient of the stored image is set to one third (1/3), and in a frame period started at time T14 of FIG. 10, the weight coefficient of the image being displayed on the HMD is set to three fourths (3/4) and the weight coefficient of the stored image is set to one fourth (1/4).

By doing this, it is possible to gradually decrease the ratio of the stored image contained in the images displayed on the external display device, so that the image can be changed more naturally.

SECOND MODIFIED EXAMPLE

The second modified example of the HMD 100 has the same configuration as the first modified example except that a weighted average image generation method in step S25 illustrated in FIG. 9 is different from the first modified example, the image storing unit 17 is configured to store plural virtual combined image, and the process after step S12 illustrated in FIG. 9 is different from the first modified example.

Figure 11:
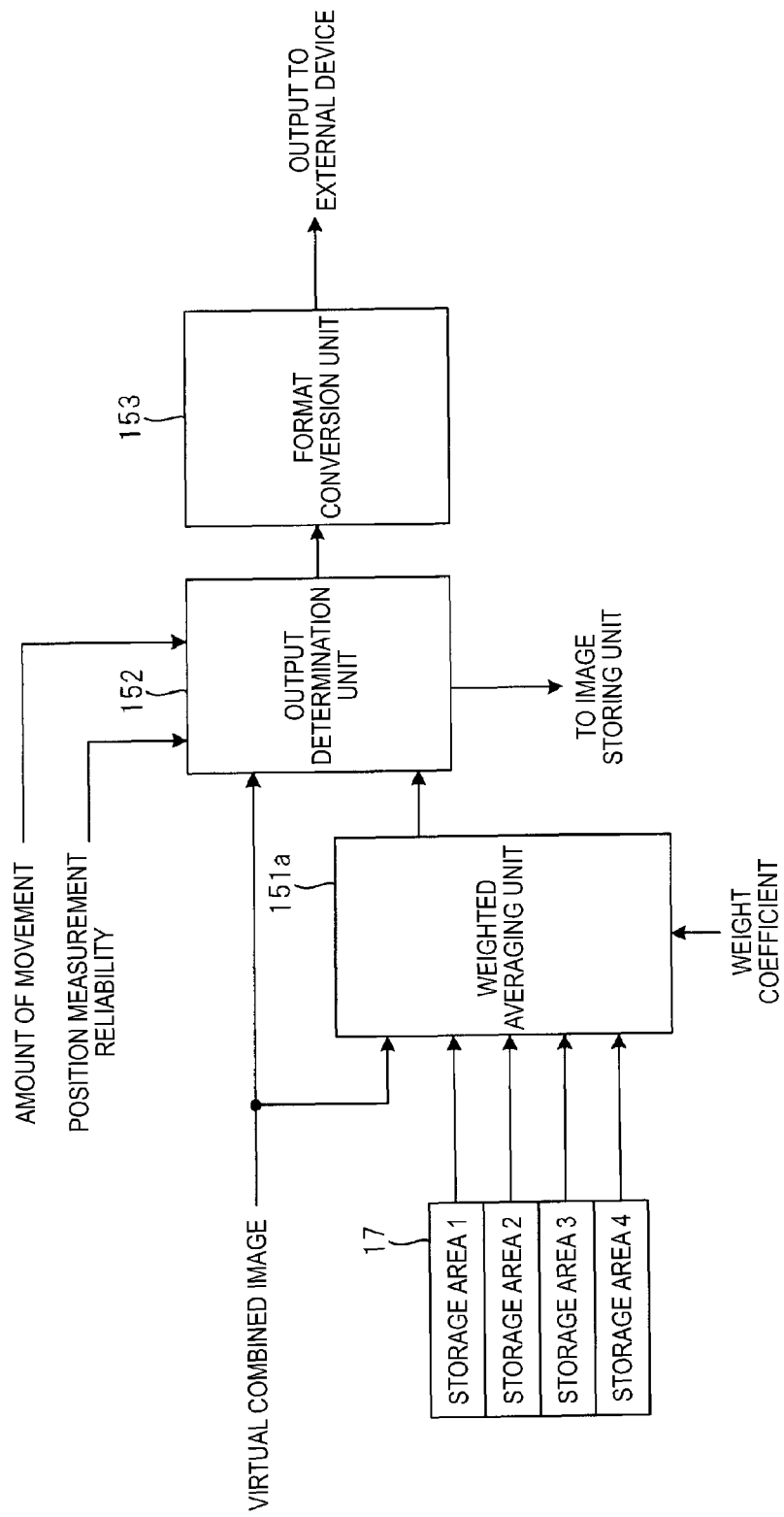
FIG. 11 is a block diagram illustrating an internal configuration of an output control unit 15 in a second modified example of the HMD 100.

FIG. 11 is a block diagram illustrating an internal configuration of the output control unit 15 in a second modified example of the HMD 100. The output control unit 15 illustrated in FIG. 11 has the same configuration as that illustrated in FIG. 8 except that the weighted averaging unit 151 is replaced by a weighted averaging unit 151a.

The weighted averaging unit 151 performs a weighted average for either the virtual combined image stored in the image storing unit and the virtual combined image generated by the virtual image combining units 14R, 14L to generate an image for external or a plurality of the virtual combined images stored in the image storing unit 17 to generate the image for external output.

Figure 12:
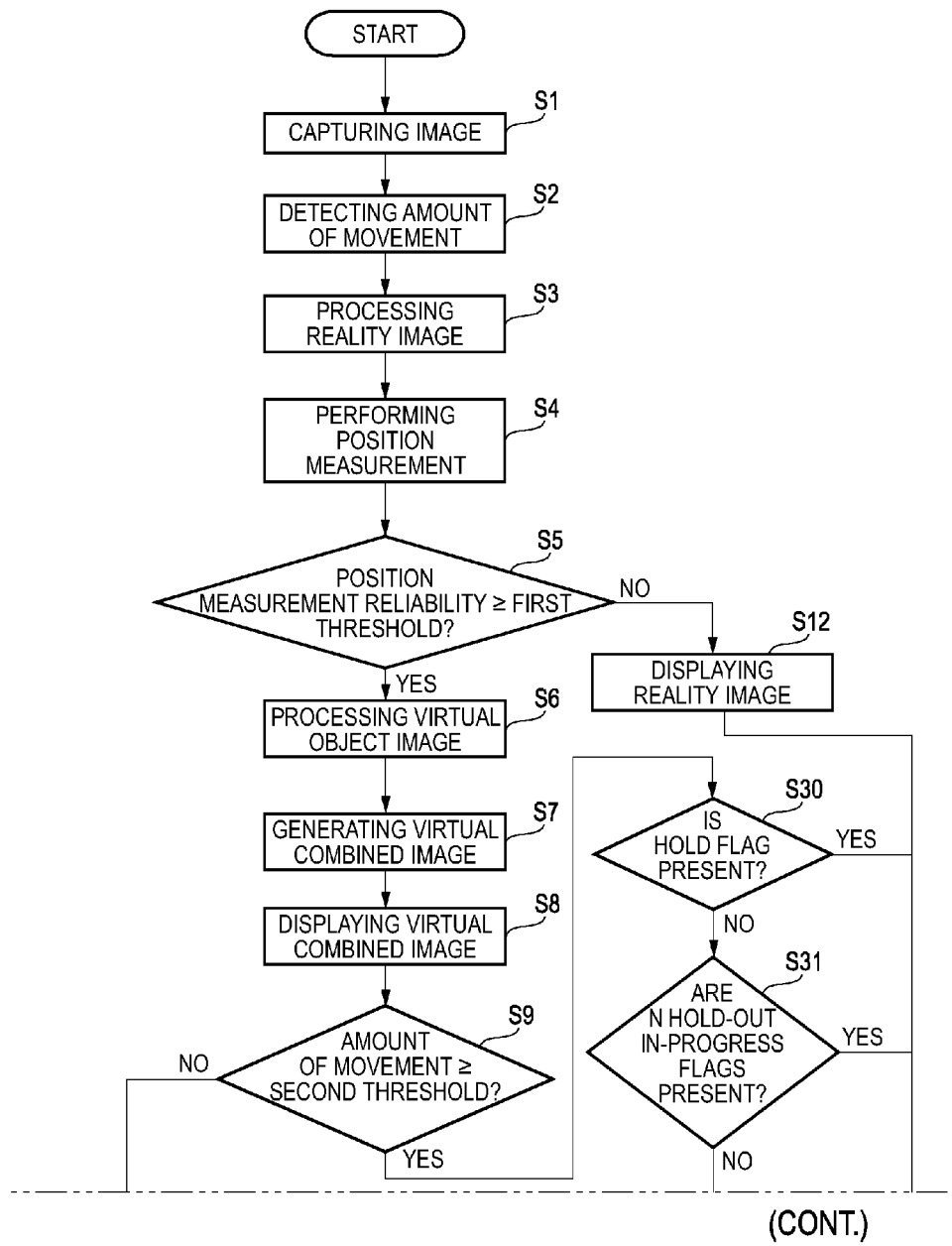
FIG. 12 is a flow chart for explaining the operation during a single frame period of the second modified example of the HMD 100.

FIG. 12 is a flow chart for explaining operations during a single frame period of the second modified example of the HMD 100. In FIG. 12, the same reference numerals are given to the same processing as those in FIG. 9.

FIG. 12 illustrates a flowchart in which step S25 in FIG. 9 is replaced by step S35, steps S30 to S35 are added as steps to be performed when the determination result at step S9 is "YES", and the process after step S13 are performed when the determination result at step S30 or S31 is "YES".

At step S35, the output determination unit 152 performs a first migration output control which causes an image for external output formed by performing a weighted average for the virtual combined image generated in the virtual image combining units 14R, 14L and at least one of the virtual combined images that had been generated previously than these virtual combined images to be generated in the weighted averaging unit 151a, and outputs the image for external output to the external display device through the format conversion unit 153.

At step S30, the output determination unit 152 determines whether the hold flag is stored in the internal memory. If the hold flag is not stored therein, the process proceeds to step S31. Otherwise, the process proceeds to step S13.

At step S31, the output determination unit 152 determines whether n hold-out in-progress flags are stored in the internal memory. If the determination result at step S31 is "YES", the output determination unit 152 performs a processing of step S13. If the determination result at step S31 is "NO", the output determination unit 152 performs a processing of step S32.

At step S32, the output determination unit 152 performs a second migration output control that causes an image for external output formed by performing a weighted average for the virtual combined image generated in the virtual image combining units 14R, 14L and a plurality of virtual combined images selected from the virtual combined images that had been generated previously than these virtual combined image to be generated in the weighted averaging unit 151a, and outputs the image for external output to the external display device through the format conversion unit 153.

After step S32, the output determination unit 152 stores one hold-in in-progress flag in the internal memory (step S33), and ends the process.

Hereinafter, descriptions will be made regarding the details of a method for generating the image for external output in the weighted averaging unit 151a during a first migration output control with reference to FIG. 13 and the details of a method for generating the image for external output in the weighted averaging unit 151a during a second migration output control with reference FIG. 14.

FIG. 13 is a state transition diagram for explaining the operation of the second modified example of the HMD 100. FIG. 13 illustrates operations for a state transition from a state where the position measurement reliability is the first threshold or more and the amount of movement is the second threshold or more to a state where the position measurement reliability is the first threshold or more and the amount of movement is less than the second threshold.

The denotations represented in FIG. 13 are the same as those represented in FIG. 4. Further, only an image corresponding to right eye is illustrated in FIG. 13. The operations when n=5 are illustrated in FIG. 13.

Further, a state transition from a state where the position measurement reliability is less than the first threshold to a state where the position measurement reliability is the first threshold or more and the amount of movement is less than the second threshold corresponds to a state transition where a difference between FIG. 4 and FIG. 13 is only a situation that at time T12, the position measurement reliability becomes the first threshold or more and the amount of movement becomes less than the second threshold, and the image being displayed on the HMD at times T10, 11 does not become the virtual combined image but becomes the reality images, and their basic operations are equal.

At each of times T10 and T11, the amount of movement of the HMD 100 is the second threshold or more, and the hold flag has been stored in the internal memory of the output determination unit 152.

For this reason, in the frame periods started at each of times T10 and T11, the virtual combined image generated after images are captured is displayed on the display unit 3R, but the virtual combined image is not output to the external display device. A stored image A stored in the "storage area 1" of the image storing unit 17 is output to the external display device instead of the virtual combined image (the hold output control is performed).

When the amount of movement of the HMD 100 is less than the second threshold at time T12, the hold flag is stored but none of hold-out in-progress flags is stored in the internal memory of the output determination unit 152 at time T12. For this reason, in a frame period started at time T12, an image for external output is generated with a weighted average processing and the image for the external output is output to the external display device (a first migration output control is performed for the first time).

Specifically, an image B generated by adding the virtual combined image (1) being displayed on the HMD and the virtual combined image A being stored in the "storage area 1" of the image storing unit 17, and by dividing the sum of them by 2 is output to the external display device.

When the image B is output to the external display device, one hold-out in-progress flag is stored in the internal memory of the output determination unit 152. Further, when the image B is output to the external display device, the virtual combined image (1) is stored in the "storage area 2" of the image storing unit 17.

At next time T13, the hold flag and one hold-out in-progress flag have been stored in the internal memory of the output determination unit 152.

For this reason, in a frame period started at time T13, an image for the external output is generated with the weighted average processing and the image for external output is output to the external display device (the first output control is performed for the second time).

Specifically, an image C generated by adding the virtual combined image (2) being displayed on the HMD, the virtual combined image A stored in the "storage area 1" of the image storing unit 17 and the virtual combined image (1) stored in the "storage area 2" of the image storing unit 17, and by dividing the sum of these images by 3 is output to the external display device.

When the image C is output to the external display device, one hold-out in-progress flag is added in the internal memory of the output determination unit 152. Further, when the image C is output to the external display device, the virtual combined image (2) is stored in the "storage area 3" of the image storing unit 17.

At next time T14, the hold flag and two hold-out in-progress flags have been stored in the internal memory of the output determination unit 152.

For this reason, in a frame period started at time T14, an image for the external output is generated with the weighted average processing and the image for the external output is output to the external display device (the first output control is performed for the third time).

Specifically, an image D generated by adding the virtual combined image (3) being displayed on the HMD, the virtual combined image A being stored in the "storage area 1" of the image storing unit 17, the virtual combined image (1) being stored in the "storage area 2" of the image storing unit 17 and the virtual combined image (2) stored in the "storage area 3" of the image storing unit 17, and by dividing the sum of these images by 4 is output to the external display device.

When the image D is output to the external display device, one hold-out in-progress flag is added in the internal memory of the output determination unit 152. Further, when the image D is output to the external display device, the virtual combined image (3) is stored in the "storage area 4" of the image storing unit 17.

At next time T15, the hold flag and three hold-out in-progress flags have been stored in the internal memory of the output determination unit 152.

For this reason, in a frame period started at time T15, an image for external output is generated with the weighted average processing and the image for external output is output to the external display device (the first output control is performed for the fourth time).

Specifically, an image E generated by adding the virtual combined image (4) being displayed on the HMD, the virtual combined image (2) stored in the "storage area 3" of the image storing unit 17, the virtual combined image (3) stored in the "storage area 4" of the image storing unit 17, and by dividing the sum of these images by 3 is output to the external display device.

When the image E is output to the external display device, one hold-out in-progress flag is added in the internal memory of the output determination unit 152. Further, when the image E is output to the external display device, the virtual combined image (4) is overwritten into the "storage area 1" of the image storing unit 17 and the virtual combined image (1) stored in the "storage area 2" is cleared.

At next time T16, the hold flag and four hold-out in-progress flags have been stored in the internal memory of the output determination unit 152.

For this reason, in a frame period started at time T16, an image for the external output is generated with the weighted average processing and the image for external output is output to the external display device (the first output control is performed for the fifth time).

Specifically, an image F generated by adding the virtual combined image (5) being displayed on the HMD and the virtual combined image (4) stored in the "storage area 1" of the image storing unit 17, and dividing the sum of them by 2 is output to the external display device.

When the image F is output to the external display device, one hold-out in-progress flag is added in the internal memory of the output determination unit 152. Further, when the image F is output to the external display device, the virtual combined images (2) and (3) that are stored in the "storage area 3" and "storage area 4" of the image storing unit 17, respectively, are cleared.

At next time T17, the hold flag and five hold-out in-progress flags have been stored in the internal memory of the output determination unit 152.

For this reason, the virtual combined image (6) being displayed on the HMD is overwritten into the "storage area 1" of the image storing unit 17 and the virtual combined image (6) is output to the external display device (the normal output control is performed).

When the virtual combined image (6) is output to the external display device, the hold flag and all the hold-out in-progress flags stored in the internal memory of the output determination unit 152 are cleared. For this reason, after time T17, virtual combined image being displayed on the HMD is directly output to the external display device.

Figure 14:
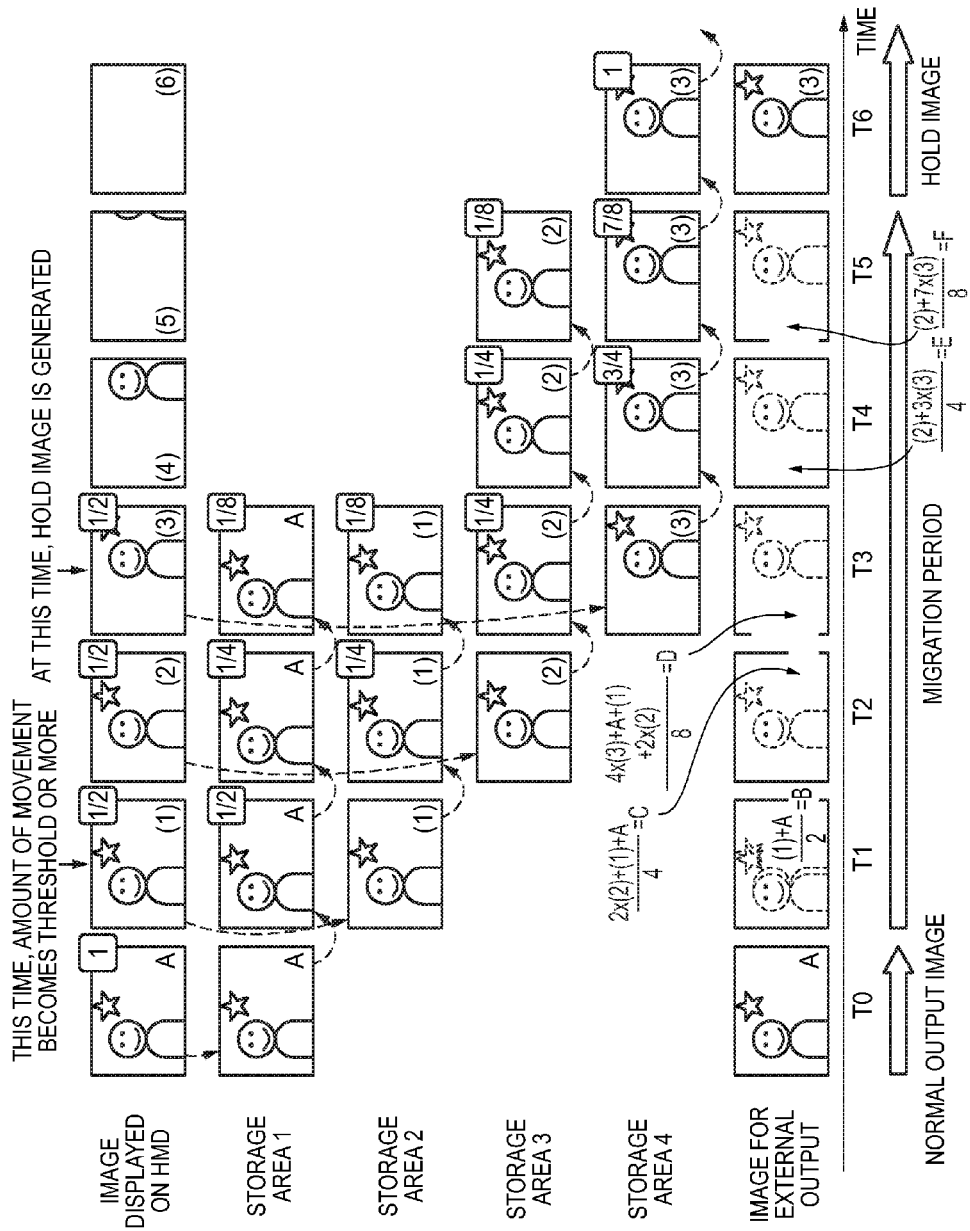
FIG. 14 is a state transition diagram for explaining the operation of the second modified example of the HMD 100.

FIG. 14 is a state transition diagram for explaining the operation of the second modified example of the HMD 100. FIG. 14 illustrates operations for a state transition from a state where the position measurement reliability is the first threshold or more and the amount of movement is less than the second threshold to a state where the position measurement reliability is the first threshold or more and the amount of movement is the second threshold or more.

The denotations represented in FIG. 14 are the same as those represented in FIG. 4. Further, only an image corresponding to right eye is illustrated in FIG. 14. Further, an operation when n=5 is illustrated in FIG. 14.

Further, operations for a state transition from a state where the position measurement reliability is the first threshold or more and the amount of movement is less than the second threshold to a state where the position measurement reliability is less than the first threshold are the same as those illustrated in FIG. 6.

In the frame periods started at each of times T0, the position measurement reliability is the first threshold or more and the amount of movement is less than the second threshold or more, and the hold flag is not stored. For this reason, the virtual combined image A generated after images are captured is displayed on the display unit 3R, the virtual combined image A is output to the external display device (the normal output control is performed), and the virtual combined image A is stored in the "storage area 1" of the image storing unit 17.

When the position measurement reliability is the first threshold or more and the amount of movement of HMD 100 is the second threshold or more at time T1, any of hold-out in-progress flags has not been stored in the internal memory of the output determination unit 152 at time T1. For this reason, in a frame period started at time T1, an image for external output is generated with the weighted average processing and the image for the external output is output to the external display device (a second migration output control is performed for the first time).

Specifically, an image B generated by adding the virtual combined image (1) being displayed on the HMD and the virtual combined image A stored in the "storage area 1" of the image storing unit 17, and by dividing the sum of these images by 2 is output to the external display device.

When the image B is output to the external display device, one hold-out in-progress flag is stored in the internal memory of the output determination unit 152. Further, when the image B is output to the external display device, the virtual combined image (1) is stored in the "storage area 2" of the image storing unit 17.

At next time T2, one hold-out in-progress flag has been stored in the internal memory of the output determination unit 152.

For this reason, in a frame period started at time T2, an image for external output is generated with the weighted average processing and the image for external output is output to the external display device (the second migration output control is performed for the second time).

Specifically, an image C generated by adding an image generated by multiplying one-half (½) times the virtual combined image (2) being displayed on the HMD, an image generated by multiplying one-fourth (¼) times the virtual combined image A being stored in the "storage area 1" of the image storing unit 17, and an image generated by multiplying one-fourth (¼) times the virtual combined image (1) being stored in the "storage area 2" of the image storing unit 17 is output to the external display device.

When the image C is output to the external display device, one hold-out in-progress flag is stored in the internal memory of the output determination unit 152. Further, when the image C is output to the external display device, the virtual combined image (2) is stored in the "storage area 3" of the image storing unit 17.

At next time T3, two hold-out in-progress flags have been stored in the internal memory of the output determination unit 152.

For this reason, in a frame period started at time T3, an image for the external output is generated with the weighted average processing and the image for the external output is output to the external display device (the second output control is performed for the third time).

Specifically, an image D generated by adding an image generated by multiplying one-half (½) times the virtual combined image (3) being displayed on the HMD, an image generated by multiplying one-eighth (⅛) times the virtual combined image A being stored in the "storage area 1" of the image storing unit 17, an image generated by multiplying one-eighth (⅛) times the virtual combined image (1) being stored in the "storage area 2" of the image storing unit 17 and an image generated by multiplying one-fourth (¼) times the virtual combined image (2) being stored in the "storage area 3" of the image storing unit 17, is output to the external display device.

When the image D is output to the external display device, one hold-out in-progress flag is stored in the internal memory of the output determination unit 152. Further, when the image D is output to the external display device, the virtual combined image (3) is stored in the "storage area 4" of the image storing unit 17.

At next time T4, three hold-out in-progress flags have been stored in the internal memory of the output determination unit 152.

For this reason, in a frame period started at time T4, an image for external output is generated with the weighted average processing and the image for external output is output to the external display device (the second output control is performed for the fourth time).

Specifically, an image E generated by adding an image generated by multiplying one-fourth (¼) times the virtual combined image (2) stored in the "storage area 3" of the image storing unit 17 and an image generated by multiplying three-fourths (¾) times, the virtual combined image (3) stored in the "storage area 4" of the image storing unit 17 is output to the external display device.

When the image E is output to the external display device, one hold-out in-progress flag is stored in the internal memory of the output determination unit 152. Further, when the image E is output to the external display device, the data stored in the "storage area 1" and the "storage area 2" are cleared.

At next time T5, four hold-out in-progress flags have been stored in the internal memory of the output determination unit 152.

For this reason, in a frame period started at time T5, an image for external output is generated with the weighted average processing and the image for external output is output to the external display device (the second migration output control is performed for the fifth time).

Specifically, an image F generated by adding an image generated by multiplying one-eighth (⅛) times the virtual combined image (2) stored in the "storage area 3" of the image storing unit 17 and an image generated by multiplying seven-eighths (⅞) times the virtual combined image (3) stored in the "storage area 4" of the image storing unit 17, is output to the external display device.

When the image F is output to the external display device, one hold-out in-progress flag is stored in the internal memory of the output determination unit 152. Further, when the image F is output to the external display device, the data stored in the "storage area 3" of the image storing unit 17 is cleared.

At next time T6, five (equals to n) hold-out in-progress flags have been stored in the internal memory of the output determination unit 152.

For this reason, in a frame period started at time T6, the virtual combined image (3) stored in the "storage area 4" of the image storing unit 17 is output to the external display device (the hold output control is performed).

Also, after time T6, the virtual combined image (3) stored in the "storage area 4" is continued to be displayed on the external display device.

As described above, in the second modified example, when a state transition from a state where the amount of movement of the HMD 100 is the second threshold or more to a state where the amount of movement of HMD 100 is less than the second threshold is occurred, a control performed by the output control unit 15 is not directly switched from the hold output control to the normal output control but switched to the normal output control after performs the first migration output control n times.

The first migration output control is a control that causes the image for the external output obtained by performing the weighted average for the virtual combined image generated in the image combining units 14R, 14L and the virtual combined image stored in the image storing unit 17 to be output to the external display device. Also, in the second modified example, the weight coefficient set in each frame period during which the first migration output control is performed is changed for each frame period making it possible to gradually increase the ratio of the new virtual combined image in a sense of time series contained in the image for external output while gradually decreasing the virtual combined image A contained in the virtual combined image A.

By performing the first migration output control, an image to be displayed on the external display device is not changed abruptly from the virtual combined image A to the virtual combined image (6), but can be gradually changed from the virtual combined image A to the virtual combined image (6).

For this reason, it is possible to prevent an image stimulus due to a large change of image from being given to the person who views the external display device. Further, the images B, C, D, E, F displayed on the external display device during the migration output control, as illustrated in FIG. 13, become completely different images in appearance from the images A, 6 displayed during the hold output control and the normal output control, so that it becomes easy to know timing of return from a hold state to a normal state.

Further, in the second modified example, when a state transition from a state where the amount of movement of the HMD 100 is less than the second threshold or more is changed to a state where the amount of movement of HMD 100 is the second threshold or more is occurred, a control performed by the output control unit 15 is not directly switched from the normal output control to the hold output control but switched to the hold output control after performs the second migration output control n times.

The second migration output control causes the weighted average to be performed for the virtual combined image generated in the virtual image combining units 14R, 14L, and for a plurality of virtual combined images selected from the virtual combined images that had been generated previously than the virtual combined image generated in the virtual image combining units 14R, 14L, to generate an image for the external output, and outputs the image for the external output to the external display device.

In the example of FIG. 14, a third frame period (frame period starting at time T3) among five frame periods during which the second migration output control is performed is set as a hold frame period, and the virtual combined image during the hold frame period is set as an image to be output to the external display device in a frame period (frame period starting at time T6) during which the normal output control is performed.

Also, in frame periods (frame periods starting at each of times T1 to T3) before the hold frame period, the weighted average processing is performed for the virtual combined image generated during the frame period and for at least one of the virtual combined images generated at a period corresponding to at least one previous frame period than the frame period by the virtual image combining units 14R, 14L, to generate the image for the external output.

Also, in frame periods (frame periods starting at times T4 and T5 illustrated in FIG. 14) after the hold frame period, the weighted average processing is performed for the virtual combined image (3) generated during the hold frame period and the virtual combined image (2) generated at one frame period before the hold frame period to generate the image for external output.

In n times frame periods, the weight coefficient is changed for each frame period to gradually increase a ratio of new virtual combined images among the virtual combined images corresponding to a target image for which the weighted average is performed.

By performing the second migration output control n times, an image to be displayed on the external display device is not changed abruptly from the virtual combined image A to the virtual combined image (3) but can be gradually changed from the virtual combined image A to the virtual combined image (3).

By doing this, it is possible to erase a sense of discomfort caused by an abrupt change of an image to be displayed from virtual combined image A to the virtual combined image (3).

Also, the number of control times (n) performed when a control is switched from the hold output control to the normal output control needs to be a natural number of 2 or more. Further, it is necessary to set any of frame periods from a first to n-1th times among n times frame periods during which the second migration output control is performed as the hold frame period.

THIRD MODIFIED EXAMPLE

Hereinafter, the modified example of the operations of the HMD 100 at each times of T12 to T16 in FIG. 13 will be described with reference to FIG. 15, and the modifies example of the operations of the HMD 100 at each times of T1 to T5 2 in FIG. 14 will be described with reference to FIG. 16.

Figure 15:
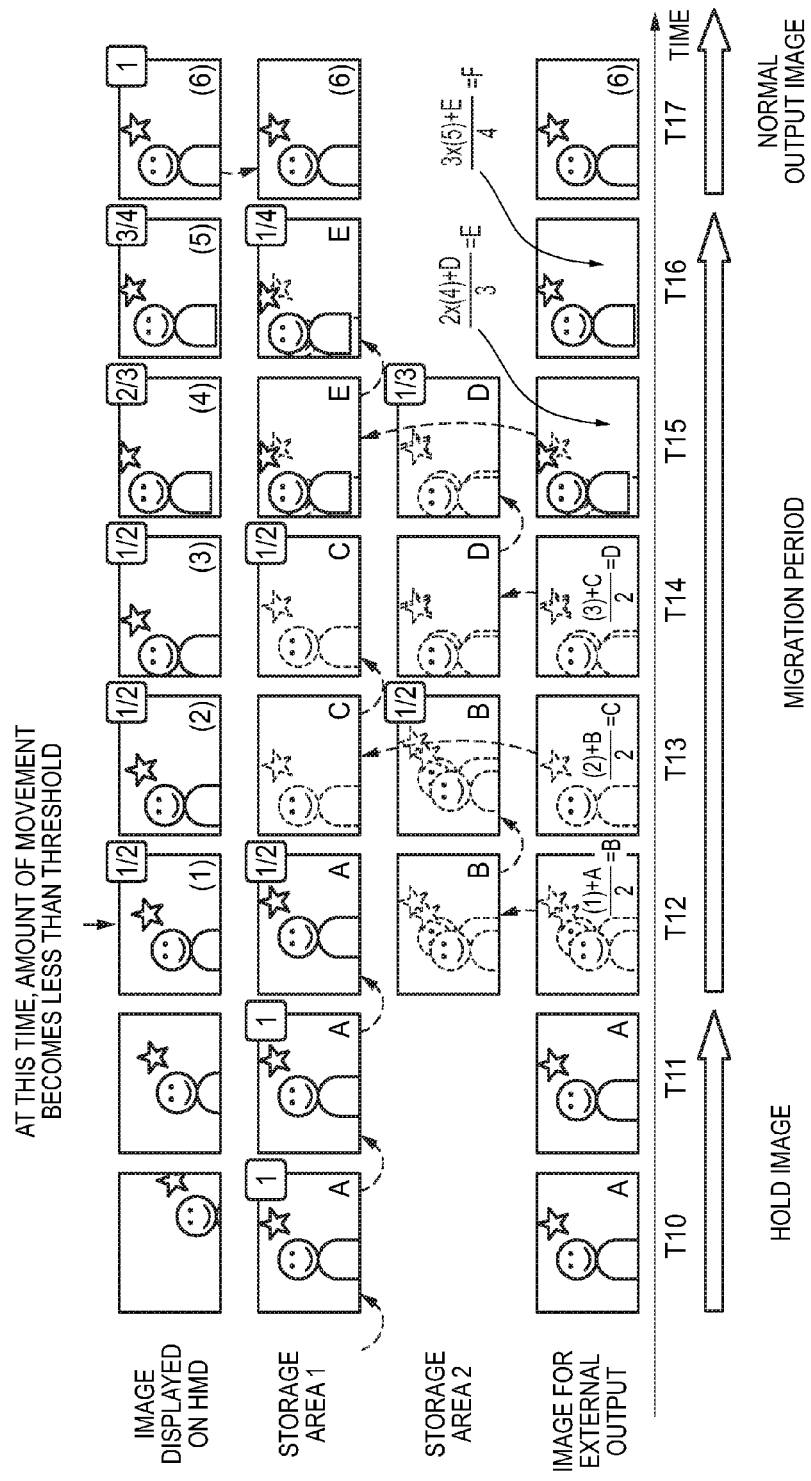
FIG. 15 is a state transition diagram for explaining the operation of a third modified example of the HMD 100.

FIG. 15 is a state transition diagram for explaining operations of a third modified example of the HMD 100. In FIG. 15, the states except for the states at times T12 to T16 are the same as those illustrated in FIG. 13.

When the amount of movement of the HMD 100 is less than the second threshold at time T12, the hold flag is stored but any of hold-out in-progress flags is not stored in the internal memory of the output determination unit 152.

For this reason, in a frame period started at time T12, an image for external output is generated with a weighted average processing and the image for external output is output to the external display device (a first migration output control is performed for the first time).

Specifically, an image B generated by adding the virtual combined image (1) being displayed on the HMD and the virtual combined image A being stored in the "storage area 1" of the image storing unit 17 and dividing the sum of them by 2 is output to the external display device.

When the image B is output to the external display device, one hold-out in-progress flag is stored in the internal memory of the output determination unit 152. Further, when the image B is output to the external display device, the image B is stored in the "storage area 2" of the image storing unit 17.

At next time T13, the hold flag and one hold-out in-progress flag have been stored in the internal memory of the output determination unit 152.

For this reason, in a frame period started at time T13, an image for external output is generated with the weighted average processing and the image for external output is output to the external display device (the first migration output control is performed for the second time).

Specifically, an image C generated by adding the virtual combined image (2) being displayed on the HMD and the virtual combined image B stored in the "storage area 2" of the image storing unit 17 and by dividing the sum of these images by 2 is output to the external display device.

When the image C is output to the external display device, one hold-out in-progress flag is added in the internal memory of the output determination unit 152. Further, when the image C is output to the external display device, the image C is overwritten into the "storage area 1" of the image storing unit 17.

At next time T14, the hold flag and two hold-out in-progress flags have been stored in the internal memory of the output determination unit 152.

For this reason, in a frame period started at time T14, an image for external output is generated with the weighted average processing and the image for external output is output to the external display device (the first migration output control is performed for the third time).

Specifically, an image D generated by adding the virtual combined image (3) being displayed on the HMD and the virtual combined image C being stored in the "storage area 1" of the image storing unit 17 and dividing the sum of them by 2 is output to the external display device.

When the image D is output to the external display device, one hold-out in-progress flag is added in the internal memory of the output determination unit 152. Further, when the image D is output to the external display device, the image D is overwritten into the "storage area 2" of the image storing unit 17.

At next time T15, the hold flag and three hold-out in-progress flags have been stored in the internal memory of the output determination unit 152.

For this reason, in a frame period started at time T15, an image for the external output is generated with the weighted average processing and the image for external output is output to the external display device (the first migration output control is performed for the fourth time).

Specifically, an image E obtained by adding an image generated by multiplying two-thirds (⅔) times the virtual combined image (4) being displayed on the HMD and an image generated by multiplying one-third (⅓) times the image D being stored in the "storage area 2" of the image storing unit 17 is output to the external display device.

When the image E is output to the external display device, one hold-out in-progress flag is added in the internal memory of the output determination unit 152. Further, when the image E is output to the external display device, the image E is overwritten into the "storage area 1" of the image storing unit 17.

At next time T16, the hold flag and four hold-out in-progress flags have been stored in the internal memory of the output determination unit 152.

For this reason, in a frame period started at time T16, an image for the external output is generated with the weighted average processing and the image for external output is output to the external display device (the first migration output control is performed for the fifth time).

Specifically, an image F obtained by adding an image generated by multiplying three-fourths (¾) times the virtual combined image (5) being displayed on the HMD and an image generated by multiplying one-fourth (¼) times the image E stored in the "storage area 1" of the image storing unit 17 is output to the external display device.

When the image F is output to the external display device, one hold-out in-progress flag is added in the internal memory of the output determination unit 152. Further, when the image F is output to the external display device, the image D stored in the "storage area 2" of the image storing unit 17 is cleared.

At next time T17, the hold flag and five hold-out in-progress flags have been stored in the internal memory of the output determination unit 152.

For this reason, the virtual combined image (6) being displayed on the HMD is overwritten into the "storage area 1" of the image storing unit 17 and the virtual combined image (6) is output to the external display device (the normal output control is performed).

When the virtual combined image (6) is output to the external display device, all the hold flag and the hold-out in-progress flags stored in the internal memory of the output determination unit 152 are cleared. For this reason, after time T17, virtual combined image being displayed on the HMD is output to the external display device as it is.

Figure 16:
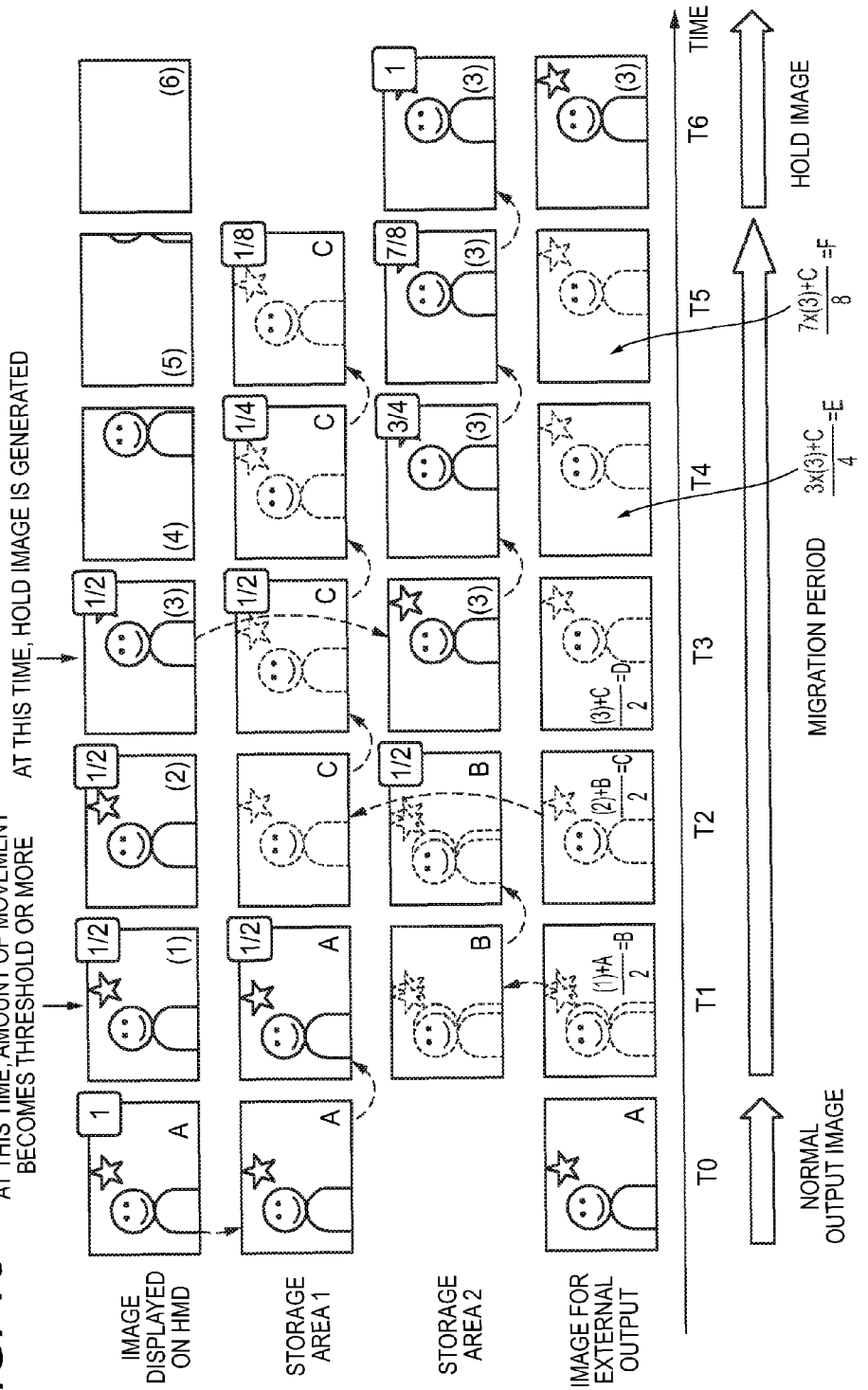
FIG. 16 is a state transition diagram for explaining the operation of the third modified example of the HMD 100.

FIG. 16 is a state transition diagram for explaining operations of a third modified example of the HMD 100. In FIG. 16, the states except for the states at times T1 to T5 are the same as those illustrated in FIG. 14.

When the amount of movement of the HMD 100 is the second threshold or more at time T1, a hold flag and any of hold-in in-progress flags do not have been stored in the internal memory of the output determination unit 152.

For this reason, in a frame period started at time T1, an image for external output is generated with the weighted average processing and the image for external output is output to the external display device (a second migration output control is performed for the first time).

Specifically, an image B generated by adding the virtual combined image (1) being displayed on the HMD and the virtual combined image A stored in the "storage area 1" of the image storing unit 17, and by dividing the sum of these images by 2 is output to the external display device.

When the image B is output to the external display device, one hold-in in-progress flag is stored in the internal memory of the output determination unit 152. Further, when the image B is output to the external display device, the image B is stored in the "storage area 2" of the image storing unit 17.

At next time T2, one hold-in in-progress flag has been stored in the internal memory of the output determination unit 152.

For this reason, in a frame period started at time T2, an image for external output is generated with the weighted average processing and the image for external output is output to the external display device (the second migration output control is performed for the second time).

Specifically, an image C obtained by adding the virtual combined image (2) being displayed on the HMD and an image B stored in the "storage area 2" of the image storing unit 17, and by dividing the sum of these images by 2 is output to the external display device.

When the image C is output to the external display device, one hold-in in-progress flag is stored in the internal memory of the output determination unit 152. Further, when the image C is output to the external display device, the image C is overwritten into the "storage area 1" of the image storing unit 17.

At next time T3, two hold-in in-progress flags have been stored in the internal memory of the output determination unit 152.

For this reason, in a frame period started at time T3, an image for external output is generated with the weighted average processing and the image for external output is output to the external display device (the second migration output control is performed for the third time).

Specifically, an image D that can be obtained by adding the virtual combined image (3) being displayed on the HMD and the virtual combined image C being stored in the "storage area 1" of the image storing unit 17, and dividing the sum of them by 2 is output to the external display device.

When the image D is output to the external display device, one hold-in in-progress flag is stored in the internal memory of the output determination unit 152. Further, when the image D is output to the external display device, the virtual combined image (3) is stored in the "storage area 2" of the image storing unit 17.

At next time T4, three hold-in in-progress flags have been stored in the internal memory of the output determination unit 152.

For this reason, in a frame period started at time T4, an image for external output is generated with the weighted average processing and the image for external output is output to the external display device (the second migration output control is performed for the fourth time).

Specifically, an image E generated by adding an image generated by multiplying one-fourth (¼) times the virtual combined image C stored in the "storage area 1" of the image storing unit 17 and an image generated by multiplying three-fourths (¾) times the virtual combined image (3) stored in the "storage area 2" of the image storing unit 17 is output to the external display device.

When the image E is output to the external display device, one hold-in in-progress flag is stored in the internal memory of the output determination unit 152.

At next time T5, four hold-in in-progress flags have been stored in the internal memory of the output determination unit 152.

For this reason, in a frame period started at time T5, an image for external output is generated with the weighted average processing and the image for external output is output to the external display device (the second migration output control is performed for the fifth time).

Specifically, an image F generated by adding an image generated by multiplying one-eighths (⅛) times the virtual combined image C stored in the "storage area 1" of the image storing unit 17 and an image generated by multiplying seven-eighths (⅞) times the virtual combined image (3) stored in the "storage area 2" of the image storing unit 17 is output to the external display device.

When the image F is output to the external display device, one hold-in in-progress flag is stored in the internal memory of the output determination unit 152. Further, when the image F is output to the external display device, the data stored in the "storage area 1" is cleared.

At next time T6, five (equals to n) hold-in in-progress flags have been stored in the internal memory of the output determination unit 152.

For this reason, in a frame period started at time T6, the virtual combined image (3) stored in the "storage area 2" of the image storing unit 17 is output to the external display device (the hold output control is performed).

Also, after time T6, the virtual combined image (3) stored in the "storage area 2" is continued to be displayed on the external display device.

The first migration output control performed during a frame period started at each of times T12 to T16 illustrated in FIG. 15 is a control that causes the weighted average processing to be performed for the virtual combined image generated during the frame period and the virtual combined image being displayed on the external display device in a frame period next to before the frame period to generate an image for external output, and outputs the generated image for external output to the external display device.

According to the first migration output control, two areas of the storage area 1 and the storage area 2 may be included in image storing unit 17, a memory capacity can be reduced than in the case of the second modified example.

The second migration output control performed during a frame period started at each of times T1 to T5 is a control that causes the weighted average processing to be performed for the virtual combined image generated during the frame period, a previous virtual combined image generated at a frame period prior to the frame period and a plurality of virtual combined images selected from the virtual combined image output to the external display device at the frame period prior to the frame period to generate an image for the external output, and outputs the image for external output to the external display device.

In the example of FIG. 16, the output control unit 15 sets a third frame period among the n frame periods during which the second migration output control is performed as a hold frame period, and performs the weighted average processing for the virtual combined image generated in the frame period and the virtual combined image output to the external display device in a frame period next to before the frame period to generate the image for the external output, in the frame periods (frame periods started at each of times T1 to T3) before the hold frame period. Further, the output control unit 15 performs the weighted average processing for the virtual combined image generated in the hold frame period and the virtual combined image output to the external display device in a frame period next to before the hold frame to generate the image for external output, in the frame periods (frame periods started at each of times T4 and T5) after the hold frame period.

Further, in frame periods after the hold frame period, the weight coefficient is changed for each frame period, so that the ratio of virtual combined image (3) contained in the image for the external output increases as a frame period approaches the frame period during which the normal output control is performed.

According to the second migration output controls performed n times, two areas of the storage area 1 and the storage area 2 may be present in image storing unit 17, a memory capacity can be further reduced than in the case of the second modified example.

In addition, also in the third modified example, the number (n) of the second migration output controls performed when the control is switched from the hold output control to the normal output control needs to be set to a natural number of 2 or more, and any one of the first to n-1$_{th}$ frame periods among the n frame periods, during each of which the second migration output control is performed, needs to be set as the hold frame period.

As described above, the present description discloses the following matters.

A disclosed augmented reality providing apparatus provided with an image capturing unit that captures an image for each frame period, includes: a global coordinates calculation unit that calculates global coordinates indicating a position on which a virtual object is required to be superimposed in a global coordinate system that defines a virtual space corresponding to a real world, based on a reality image obtained with an image capturing by the image capturing unit; a virtual image combining unit that generates a virtual combined image in which a virtual object image is combined with the reality image using the global coordinates calculated from the global coordinates calculation unit; a display unit that displays any one of the reality image and the virtual combined image; a movement amount detection unit that detects an amount of movement of the augmented reality providing apparatus; and an output control unit that in a frame period (hereinafter, referred to as a first frame period) in which a reliability of the global coordinates calculated by the global coordinates calculation unit is the first threshold or more and an amount of movement detected by the movement amount detection unit is less than the second threshold or more, performs a normal output control that causes the virtual combined image generated by the virtual image combining unit in the first frame period to be output to an external display device provided externally, and in a frame period (hereinafter, referred to as a second frame period) in which the reliability of the global coordinates becomes lower than the first threshold or the amount of movement becomes larger than the second threshold, performs a hold output control that causes the previous virtual combined image having been generated and stored by the virtual image combining unit in a frame period prior to the second frame period to be output to an external display device provided externally.

In the disclosed augmented reality providing apparatus, the output control unit, when having been migrated from the second frame period to the first frame period, that performs a control that causes an image obtained by performing a weighted average processing for the virtual combined image generated from the virtual image combining unit and the virtual combined image being output on the external display device in the second frame period to be output to the external display device, in each of at least one continuous frame periods that include a frame period right after the transition among the frame periods performed after the transition, and after the control, performs the normal output control in a frame period after at least one frame periods.

In the disclosed augmented reality providing apparatus, the output control unit increases a weight coefficient for a target virtual combined image to be undergone the weighted average processing and generated from the virtual image combining unit as a frame period approaches the frame period after at least one frame period.

In the disclosed augmented reality providing apparatus, the output control unit, when having been migrated from the second frame period to the first frame period, that performs a control that causes an image obtained by performing a weighted average processing for the virtual combined image generated from the virtual image combining unit and at least one of the virtual combined image generated by the virtual image combining unit in each of at least one of the frame periods prior to the frame period to be output to the external display device, in each of a plurality of continuous frame periods that include a frame period right after the transition among the frame periods performed after the transition, and after the control, performs the normal output control in a frame period after the plurality of the frame periods.

In the disclosed augmented reality providing apparatus, the output control unit changes the weight coefficient during the weighted average processing for each frame period, such that a ratio of virtual combined images which are included in the images after the weighted average processing and of which generation times are new is increased gradually.

In the disclosed augmented reality providing apparatus, the output control unit, when having been migrated from the first frame period to a frame period in which the reliability is the first threshold or more and the amount of movement is the second threshold or more, that performs the hold output control in a frame period after a plurality of continuous frame periods that include a frame period right after the transition among the frame periods after the transition, in the hold output control, the virtual combined image generated from the virtual image combining unit in any one of frame periods (hereinafter, referred to as a third frame period) among the frame periods except for the last frame period among the plurality of frame periods is output to the external display device, in a frame period prior to the third frame period among the plurality of frame periods, an image obtained by performing the weighted average processing for the virtual combined image generated from the virtual image combining unit and at least one of the virtual combined image generated by the virtual image combining unit in each of at least one of the frame periods prior to the frame period is output to the external display, and in a frame period after the third frame period, an image obtained by performing the weighted average processing for the virtual combined image generated from the virtual image combining unit in the third frame period and the virtual combined image generated from the virtual image combining unit in a frame period next to before the third frame period is output to the external display device.

In the disclosed augmented reality providing apparatus, the output control unit, when having been migrated from the second frame period to the first frame period, that performs a control that causes an image obtained by performing the weighted average processing for the virtual combined image generated from the virtual image combining unit and the virtual combined image output to the external display device in a frame period next to before the frame period to be output to the external display device, in each of the plurality of the continuous frame periods that include a frame period right after the transition among the frame periods performed after the transition, and after the control, performs the normal output control in a frame period after the plurality of the frame periods.

In the disclosed augmented reality providing apparatus, the output control unit, when having been migrated from the first frame period to a frame period in which the reliability is the first threshold or more and the amount of movement is the second threshold or more, that performs a hold output control in a frame period after a plurality of continuous frame periods that include a frame period right after the transition among the frame periods after the transition, in the hold output control, the virtual combined image generated from the virtual image combining unit in any one of frame periods (hereinafter, referred to as a third frame period) among the frame periods except for the last frame period among the plurality of the frame periods is output to the external display device, in a frame period prior to the third frame period among the plurality of frame periods, an image obtained by performing the weighted average processing for the virtual combined an image for each frame period generated from the virtual image combining unit and the image output to the external display device in a frame period next to before the frame period is output to the external display device, and in a frame period after the third frame period, an image obtained by performing the weighted average processing for the virtual combined image generated from the virtual image combining unit in the third frame period and the virtual combined image output to the external display device in a frame period next to before the third frame period is output to the external display device.

In the disclosed augmented reality providing apparatus, the output control unit changes the weight coefficient during the weighted average processing performed in the frame period after the third frame period for each frame period, such that a ratio of virtual combined images generated from the virtual image combining unit in the third frame period and included in an image generated after the weighted average processing is increased gradually.

Industrial Applicability

According to the present invention, it is possible to provide an augmented reality providing apparatus capable of preventing an image sickness and reduction of a feeling of an augmented reality of a third party.

While the present invention has been described in detail or with reference to specific embodiments, it is apparent from those skilled in the art that various modifications or corrections can be made without departing from a spirit and scope of the present invention.

This application claims priority to Patent Application No. 2010-251304, filed in Japan on Nov. 9, 2010, all of which are hereby incorporated by reference.

Reference Signs List

100 HMD, 3R, 3L display unit, 11 position measurement unit, 16 angular velocity sensor The invention of claimed is:

1. An augmented reality providing apparatus provided with an image capturing unit that captures an image for each frame period, comprising:
    a global coordinates calculation unit that calculates global coordinates indicating a position on which a virtual object is required to be superimposed in a global coordinate system that defines a virtual space corresponding to a real world, based on a reality image obtained with an image capturing by the image capturing unit;
    a virtual image combining unit that generates a virtual combined image in which a virtual object image is combined with the reality image using the global coordinates calculated from the global coordinates calculation unit;
    a display unit that displays any one of the reality image and the virtual combined image;
    a movement amount detection unit that detects an amount of movement of the augmented reality providing apparatus; and
    an output control unit that
        in a first frame period in which a reliability of the global coordinates calculated by the global coordinates calculation unit is equal to or greater than a first threshold and the amount of movement detected by the movement amount detection unit is equal to or less than the second threshold, performs a normal output control that causes the virtual combined image generated by the virtual image combining unit in the first frame period to be output to an external display device provided externally, and
        in a second frame period in which the reliability of the global coordinates becomes lower than the first threshold or the amount of movement becomes larger than the second threshold, performs a hold output control that causes the previous virtual combined image having been previously generated and stored by the virtual image combining unit in a frame period prior to the second frame period to be output to the external display device provided externally.

2. The augmented reality providing apparatus according to claim 1, wherein the output control unit, when the augmented reality providing apparatus has transitioned from the second frame period to the first frame period, performs the following:
    performs a control that performs weighted average processing for
        the virtual combined image generated from the virtual image combining unit and
        the virtual combined image output on the external display device in the second frame period, and
    outputs a result of the weighted average processing to the external display device, in each of at least one continuous frame periods that include a frame period right after said transition among said second and first frame periods, and
    after said control, performs the normal output control in a frame period after the at least one continuous frame periods.

3. The augmented reality providing apparatus according to claim 2,
    wherein the output control unit increases a weight coefficient used in the weighted average processing for the virtual combined image generated from the virtual image combining unit, as a frame period approaches the frame period after the at least one continuous frame periods.

4. The augmented reality providing apparatus according to claim 1, wherein the output control unit, when the augmented reality providing apparatus has transitioned from the second frame period to the first frame period, performs the following:
    performs a control that performs a weighted average processing for
        the virtual combined image generated from the virtual image combining unit and
        at least one of the virtual combined images generated by the virtual image combining unit in each of at least one of the frame periods prior to the frame period, and
    outputs a result of the weighted average processing to the external display device, in each of a plurality of continuous frame periods that include a frame period right after said transition among said second and first frame periods, and
    after said control, performs the normal output control in a frame period after the plurality of the frame periods.

5. The augmented reality providing apparatus according to claim 4,
    wherein the output control unit changes the weight coefficient used in the weighted average processing for each frame period, such that a ratio of virtual combined images for which generation times are new is increased gradually in the image obtained from the weighted average processing.

6. The augmented reality providing apparatus according to claim 1,
    wherein the output control unit, when the augmented reality providing apparatus has transitioned from the first frame period to a frame period in which the reliability is equal to or greater than the first threshold and the amount of movement is equal to or greater than the second threshold, performs the hold output control in a frame period after a plurality of continuous frame periods that include a frame period right after said transition among the frame periods, and in the hold output control, the virtual combined image generated by the virtual image combining unit in a third frame period is output to the external display device, wherein the third frame period is any frame period except for the last frame period among the plurality of continuous frame periods, and in a frame period that is the third frame period or is a frame period prior to the third frame period among the plurality of continuous frame periods, the weighted average processing is performed for the virtual combined image generated from the virtual image combining unit and at least one of the virtual combined images generated by the virtual image combining unit in each of at least one of the frame periods prior to the frame period, and a result of the weighted average processing is output to the external display, and in a frame period after the third frame period, the weighted average processing is performed for the virtual combined image generated from the virtual image combining unit in the third frame period and the virtual combined image generated from the virtual image combining unit, in a frame period that comes next after the third frame period, and an image based on the weighted average processing is output to the external display device.

7. The augmented reality providing apparatus according to claim 1, wherein the output control unit, when the augmented reality providing apparatus has transitioned from the second frame period to the first frame period, performs the following:

performs a control that performs the weighted average processing for the virtual combined image generated from the virtual image combining unit and the virtual combined image output to the external display device, and outputs a result of the weighted average processing to the external display device, in each of the plurality of the continuous frame periods that include a frame period right after said transition among said second and first frame periods, and after said control, performs the normal output control in a frame period after the plurality of continuous frame periods.

8. The augmented reality providing apparatus according to claim 1, wherein the output control unit, when the augmented reality providing apparatus has transitioned from the first frame period to a frame period in which the reliability is equal to or greater than the first threshold and the amount of movement is equal to or greater than the second threshold, performs the hold output control in a frame period after a plurality of continuous frame periods that include a frame period right after said transition among the frame periods, and in the hold output control, the virtual combined image generated by the virtual image combining unit in a third frame period is output to the external display device, wherein the third frame period is any frame period except for the last frame period among the plurality of continuous frame periods, and in a frame period being that is the third frame period or is a frame period prior to the third frame period among the plurality of continuous frame periods, the weighted average processing is performed for the virtual combined image generated by the virtual image combining unit in each frame period and the image output to the external display device in a frame period that is next to the frame period, and an image based on the weighted average processing is output to the external display device, and in a frame period after the third frame period, the weighted average processing is performed for the virtual combined image generated from the virtual image combining unit in the third frame period and the virtual combined image output to the external display device in a frame period that comes next after the third frame period, and an image based on the weighted average processing is output to the external display device.

9. The augmented reality providing apparatus according to claim 8, wherein the output control unit changes the weight coefficient during the weighted average processing performed in the frame period after the third frame period for each frame period, such that a ratio of the virtual combined images generated by the virtual image combining unit in the third frame period is increased gradually in the image obtained after the weighted average processing.

* * * * *